(12) United States Patent
Nishimoto et al.

(10) Patent No.: US 10,819,436 B2
(45) Date of Patent: Oct. 27, 2020

(54) BASE STATION APPARATUS, GROUND STATION DEVICE, AND GROUND ANTENNA DEVICE

(71) Applicant: Mitsubishi Electric Corporation, Tokyo (JP)

(72) Inventors: Hiroshi Nishimoto, Tokyo (JP); Eisuke Haraguchi, Tokyo (JP); Takashi Nishitani, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/495,759

(22) PCT Filed: May 23, 2017

(86) PCT No.: PCT/JP2017/019204
§ 371 (c)(1),
(2) Date: Sep. 19, 2019

(87) PCT Pub. No.: WO2018/216106
PCT Pub. Date: Nov. 29, 2018

(65) Prior Publication Data
US 2020/0112372 A1    Apr. 9, 2020

(51) Int. Cl.
*H04B 10/00*    (2013.01)
*H04B 10/2575*   (2013.01)
(Continued)

(52) U.S. Cl.
CPC . *H04B 10/25759* (2013.01); *H04B 10/25753* (2013.01); *H04J 3/0641* (2013.01); *H04J 14/02* (2013.01)

(58) Field of Classification Search
USPC .................................................. 398/115–117
See application file for complete search history.

(56) References Cited

U.S. PATENT DOCUMENTS 5,424,864 A * 6/1995 Emura ............. H04B 10/25754
                                                      398/116
5,867,292 A * 2/1999 Crimmins .......... H04B 10/1149
                                                      398/100
(Continued)

FOREIGN PATENT DOCUMENTS

EP       1 085 678 A2      3/2001
JP    2003-163634 A        6/2003
(Continued)

OTHER PUBLICATIONS

Nishimoto et al. "Millimeter-wave train radio communication system based on linear cell concept", Proc. of STECH 2015, 2E11, Nov. 2015, pp. 1-12.
(Continued)

*Primary Examiner* — Agustin Bello
(74) *Attorney, Agent, or Firm* — Birch, Stewart, Kolasch & Birch, LLP

(57) ABSTRACT

A base station apparatus includes a ground station device and a plurality of ground antenna devices coupled to the ground station device via an optical transmission path. The ground station device performs electrical-optical conversion on an analog electrical signal to be transmitted to a mobile station and a reference clock signal to generate optical signals, performs wavelength division multiplexing on the obtained optical signals to generate a multiplexed optical signal, and outputs the multiplexed optical signal to the optical transmission path. Each of the plurality of ground antenna devices demultiplexes the multiplexed optical signal input from the optical transmission path into demultiplexed optical signals, performs optical-electrical conversion on the demultiplexed optical signals to generate electrical signals, up-converts a frequency of the analog electrical signal obtained through the optical-electrical conversion based on the reference clock signal obtained through (Continued)

the optical-electrical conversion to generate an up-converted signal, and transmits the up-converted signal to the mobile station.

9 Claims, 21 Drawing Sheets

(51) Int. Cl.
*H04J 3/06* (2006.01)
*H04J 14/02* (2006.01)

(56) References Cited

U.S. PATENT DOCUMENTS

| | | | | |
|---|---|---|---|---|
| 6,477,154 | B1* | 11/2002 | Cheong | H04B 10/25752 |
| | | | | 370/328 |
| 6,807,374 | B1* | 10/2004 | Imajo | H04W 88/085 |
| | | | | 398/115 |
| 7,228,072 | B2* | 6/2007 | Mickelsson | H04B 10/25754 |
| | | | | 398/58 |
| 7,962,042 | B2* | 6/2011 | Deas | H04B 10/25752 |
| | | | | 398/115 |
| 8,699,982 | B2* | 4/2014 | Singh | H04W 88/085 |
| | | | | 370/280 |
| 9,184,843 | B2* | 11/2015 | Berlin | H04B 7/155 |
| 9,184,962 | B2* | 11/2015 | Tarlazzi | H04B 7/024 |
| 9,231,670 | B2* | 1/2016 | Schmid | H04B 7/0413 |
| 9,271,289 | B2* | 2/2016 | Schwab | H04W 72/0446 |
| 9,357,551 | B2* | 5/2016 | Gutman | H04W 72/048 |
| 9,413,439 | B2* | 8/2016 | Faccin | H04B 7/0413 |
| 9,621,293 | B2* | 4/2017 | Hazani | H04W 74/04 |
| 9,681,313 | B2* | 6/2017 | Malach | H04L 5/001 |
| 10,187,151 | B2* | 1/2019 | Harel | H04B 10/25753 |
| 10,284,296 | B2* | 5/2019 | Stapleton | H04W 52/245 |
| 10,297,140 | B2* | 5/2019 | Cavalcanti | G08B 21/0258 |
| 10,560,214 | B2* | 2/2020 | Lupescu | H04W 72/0446 |
| 2006/0056855 | A1* | 3/2006 | Nakagawa | G09F 9/33 |
| | | | | 398/183 |
| 2006/0213731 | A1* | 9/2006 | Lesesky | H04B 10/1143 |
| | | | | 188/158 |
| 2007/0206950 | A1* | 9/2007 | Liu | H04B 10/25756 |
| | | | | 398/115 |
| 2007/0269219 | A1* | 11/2007 | Teller | H04B 10/803 |
| | | | | 398/140 |
| 2008/0227463 | A1* | 9/2008 | Hizume | H04W 64/00 |
| | | | | 455/456.1 |
| 2009/0129782 | A1* | 5/2009 | Pederson | H04B 10/11 |
| | | | | 398/135 |
| 2009/0316608 | A1* | 12/2009 | Singh | H04W 88/085 |
| | | | | 370/280 |
| 2009/0316609 | A1* | 12/2009 | Singh | H04B 7/2609 |
| | | | | 370/280 |
| 2010/0278530 | A1* | 11/2010 | Kummetz | H04W 88/085 |
| | | | | 398/41 |
| 2011/0230197 | A1* | 9/2011 | Wu | H04W 72/04 |
| | | | | 455/450 |
| 2012/0039320 | A1* | 2/2012 | Lemson | H04W 40/02 |
| | | | | 370/338 |
| 2012/0230696 | A1* | 9/2012 | Pederson | G08B 13/19663 |
| | | | | 398/115 |
| 2013/0017863 | A1* | 1/2013 | Kummetz | H04W 28/08 |
| | | | | 455/562.1 |
| 2017/0214420 | A1* | 7/2017 | Phillips | H04W 52/46 |
| 2020/0112372 | A1* | 4/2020 | Nishimoto | H04J 14/02 |

FOREIGN PATENT DOCUMENTS

| | | |
|---|---|---|
| JP | 2007-60311 A | 3/2007 |
| JP | 4545510 B2 | 9/2010 |
| JP | 5305515 B2 | 10/2013 |
| JP | 2014-68216 A | 4/2014 |
| WO | WO 2012/044969 A1 | 4/2012 |

OTHER PUBLICATIONS

Notice of Reasons for Refusal for Japanese Application No. 2019-519846, dated Aug. 13, 2019.

Extended European Search Report issued in corresponding European Application No. 17910740.4 dated Apr. 3, 2020.

* cited by examiner

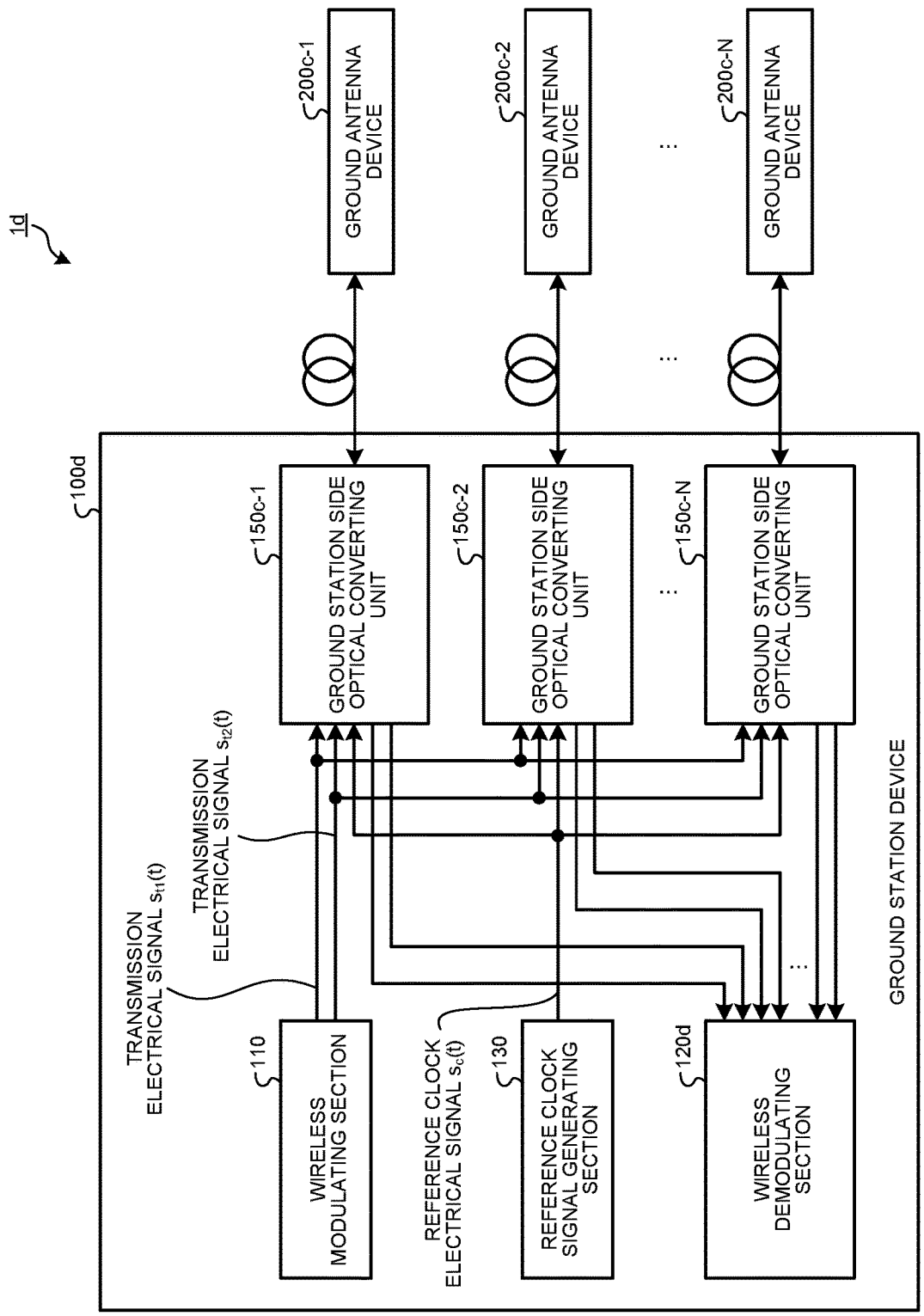

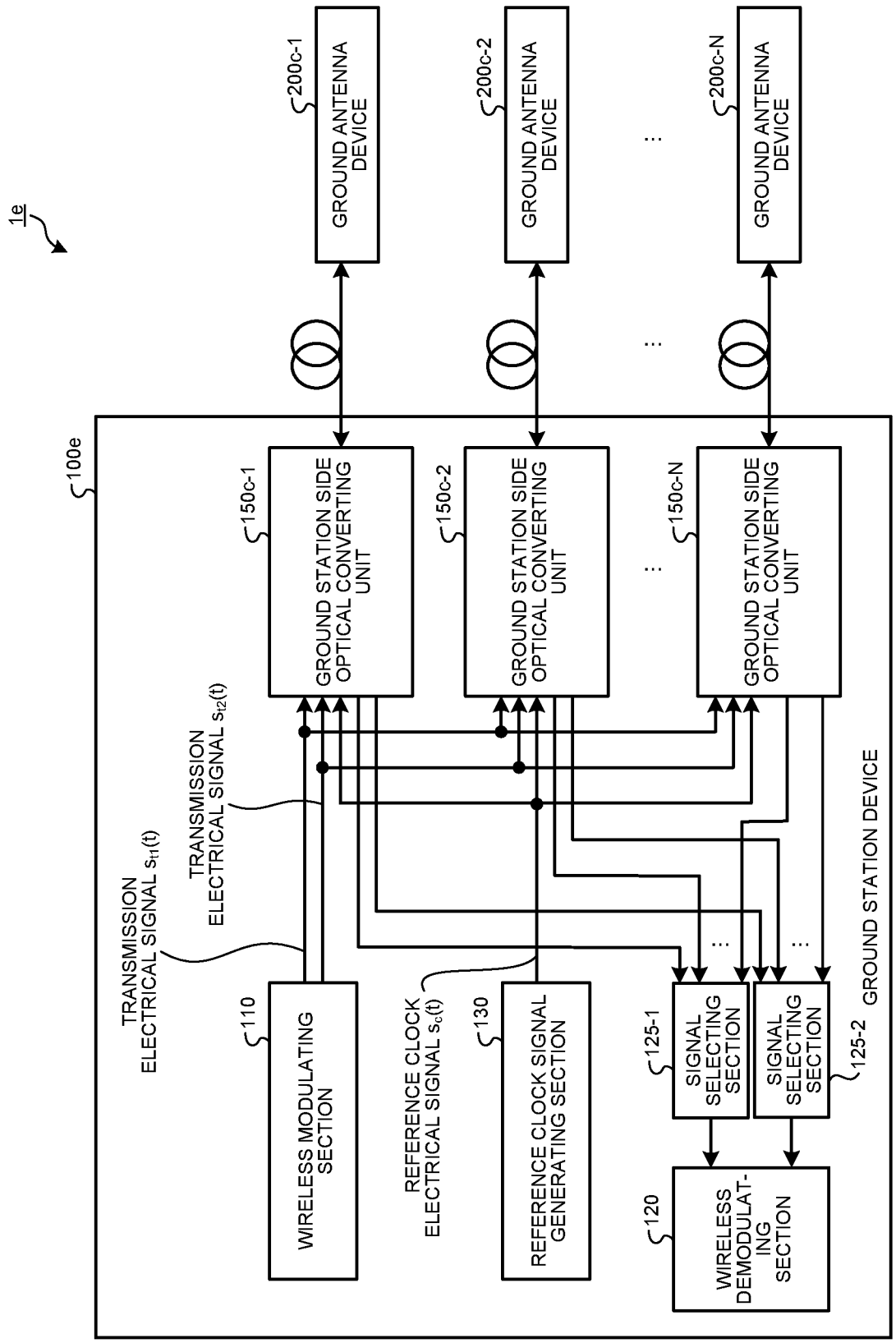

BASE STATION APPARATUS, GROUND STATION DEVICE, AND GROUND ANTENNA DEVICE

FIELD

The present invention relates to a base station apparatus, a ground station device, and a ground antenna device for transmitting signals to a mobile station using a plurality of distributed antennas.

BACKGROUND

In high-speed land mobile environments typified by expressways and railroads, traveling directions are often fixed by tracks, etc. For providing wireless communication to a mobile station moving at high speed, it is preferable to adopt, as ground side antenna equipment, a linear distributed antenna system including distributed antennas along the traveling direction. Here, a fixed communication area in which identical signals are synchronously transmitted and received at the same frequency by a plurality of continuous linear distributed antennas is called a linear cell (for example, refer to Non Patent Literature 1).

According to Non Patent Literature 1, because the communication area of a linear cell is limited to the traveling direction, efficient, high-quality wireless lines can be established by limiting the radiation direction and directivity of the antennas installed on the ground (hereinafter referred to as ground antennas) to the traveling direction. Further, a linear cell can have a larger cell diameter than a cell for the case in which different radio frequencies (RF) are used for different ground antennas, that is, different cells are formed for different ground antennas. Linear cells are advantageous particularly in the case where a mobile station moves at high speed because the frequency of inter-cell handovers can be reduced.

A promising system for the implementation of a linear cell is a remote radio system in which wireless signals are transmitted by wire to a plurality of ground antennas from a ground station that generates transmission signals to a mobile station. Ground antennas in the remote radio system are also called remote radio heads (RRH) or remote radio equipment (RRE). In particular, an optical remote radio system that uses optical fibers as transmission wires is suitable for broadband transmission. Wired transmission of broadband signals with a signal bandwidth of several hundred MHz to several GHz can be achieved simply with an analog optical radio-on-fiber or radio-over-fiber (RoF) technique in which analog wireless signals are subjected to electrical-optical conversion before being transmitted by wire. In this case, if RF band signals are in a high frequency band of several tens of GHz such as the millimeter waveband, an external modulation type optical modulator that uses Mach-Zehnder modulation or the like is necessary to perform electrical-optical conversion on the RF band signals themselves, which is costly. On the other hand, an inexpensive direct modulation type optical modulator can be used for optical conversion of intermediate frequency (IF) band signals with a center frequency of up to several GHz or baseband signals, which is economically better than the system for performing electrical-optical conversion directly on millimeter band signals.

CITATION LIST

Non Patent Literature

Non Patent Literature 1: H. Nishimoto, A. Okazaki, Y. Kinoshita, K. Tsukamoto, S. Umeda, K. Tsuji, K. Yamaguchi, and A. Okamura, "Millimeter-wave train radio communication system based on linear cell concept", Proc. STECH 2015, 2E11, November 2015.

SUMMARY

Technical Problem

Because a linear cell is a single cell, accurate radio frequency synchronization is required among a plurality of ground antennas constituting the cell. If there is an error in radio frequency between ground antennas, a mobile station needs to update the radio frequency every time the mobile station crosses the area formed by each ground antenna even while moving within a single cell, which leads to performance degradation. Meanwhile, a mobile station communicates mainly with a nearby ground antenna. However, if a signal including a radio frequency error comes from a distant ground antenna, the signal from the nearby ground antenna and the signal from the distant ground antenna interfere with each other, which leads to performance degradation. In particular, in the economically efficient remote radio system in which baseband signals or IF band signals are converted to optical signals before being transmitted by wire, because each ground antenna independently performs frequency conversion to the RF band, radio frequency synchronization should be achieved among the ground antennas.

The present invention has been made in view of the above, and an object thereof is to obtain a base station apparatus capable of accurately synchronizing the frequencies of wireless signals that are transmitted from a plurality of antennas forming a linear cell.

Solution to Problem

A base station apparatus according to an aspect of the present invention includes a ground station device and a plurality of ground antenna devices coupled to the ground station device via an optical transmission path. The ground station device performs electrical-optical conversion on an analog electrical signal to be transmitted to a mobile station and a reference clock signal to generate optical signals, performs wavelength division multiplexing on the obtained optical signals to generate a multiplexed optical signal, and outputs the multiplexed optical signal to the optical transmission path. Each of the plurality of ground antenna devices demultiplexes the multiplexed optical signal input from the optical transmission path into demultiplexed optical signals, performs optical-electrical conversion on the demultiplexed optical signals to generate electrical signals, up-converts a frequency of the analog electrical signal obtained through the optical-electrical conversion based on the reference clock signal obtained through the optical-electrical conversion to generate an up-converted signal, and transmits the up-converted signal to the mobile station.

Advantageous Effects of Invention

The base station apparatus according to the present invention can achieve the effect of accurately synchronizing the frequencies of wireless signals that are transmitted from a plurality of ground antenna devices.

BRIEF DESCRIPTION OF DRAWINGS

FIG. 22 is a diagram illustrating an exemplary configuration of a ground station device according to a fourth embodiment.

FIG. 23 is a diagram illustrating an exemplary configuration of a base station apparatus capable of achieving the same effect as the base station apparatus configured as illustrated in FIG. 22.

DESCRIPTION OF EMBODIMENTS

Hereinafter, a base station apparatus, a ground station device, and a ground antenna device according to embodiments of the present invention will be described in detail based on the drawings. The present invention is not limited to the embodiments.

First Embodiment

Figure 1:
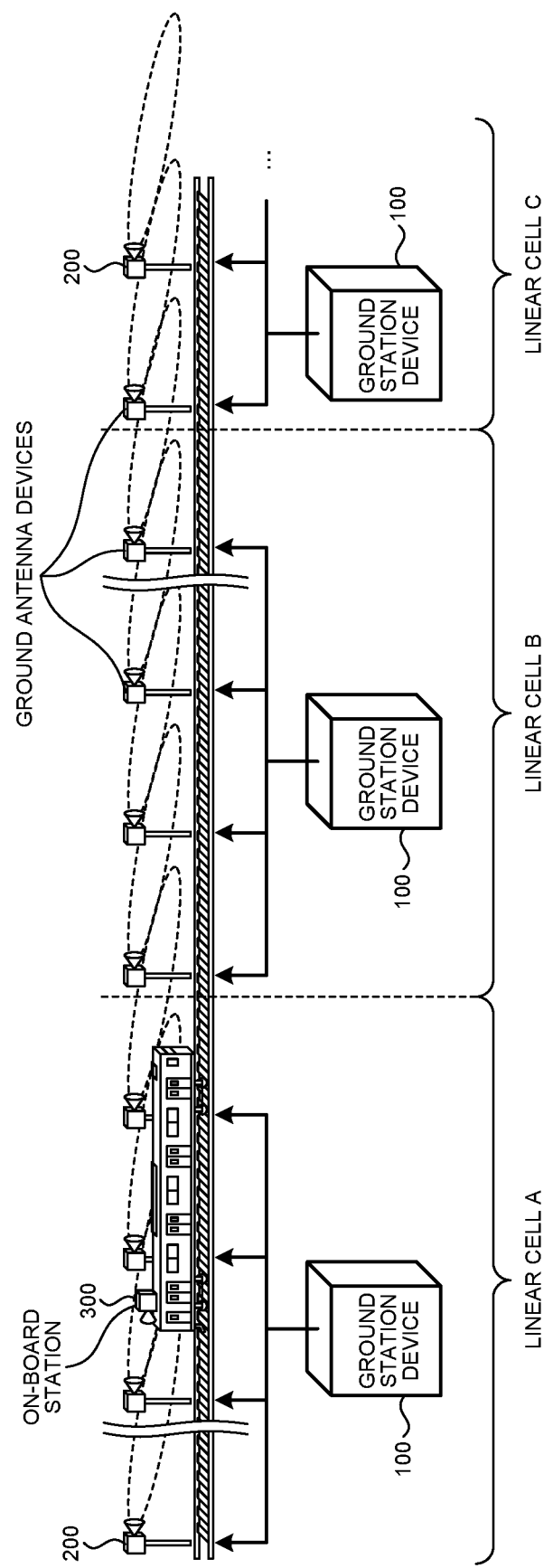
FIG. 1 is a diagram illustrating an exemplary configuration of a wireless communication system to which base station apparatuses according to a first embodiment of the present invention are applied.

FIG. 1 is a diagram illustrating an exemplary configuration of a wireless communication system to which base station apparatuses according to the first embodiment of the present invention are applied.

The wireless communication system according to the first embodiment includes a plurality of ground station devices 100 and a plurality of ground antenna devices 200. Each of the plurality of ground station devices 100 is connected to plural number of the ground antenna devices 200. The ground antenna devices 200 connected to the same ground station device 100 synchronously transmit identical signals at the same frequency. That is, one ground station device 100 and a plurality of ground antenna devices 200 connected to the ground station device 100 form one linear cell. In the example illustrated in FIG. 1, the linear cells formed by the three ground station devices 100 are denoted by the linear cells A to C. FIG. 1 also depicts an on-board station 300 mounted on a railroad car as a moving object. The on-board station 300 is a mobile station. Note that communication from the ground station devices 100, that is, from the ground antenna devices 200, to the on-board station 300 is called downlink communication, and communication in the reverse direction is called uplink communication.

Linear cells for the wireless communication system illustrated in FIG. 1 are implemented using the analog optical RoF technique. The plurality of ground station devices 100 has similar configurations and operates similarly, and the plurality of ground antenna devices 200 has similar configurations and operates similarly.

Hereinafter, one ground station device 100 and N (N≥2) ground antenna devices 200 that constitute one linear cell in the wireless communication system illustrated in FIG. 1 will be collectively referred to as a base station apparatus. In each embodiment, the configuration and operation of one base station apparatus will be described. Each embodiment mainly deals with downlink communication from the base station apparatus to the on-board station 300. In particular, the first and second embodiments provide examples of base station apparatuses in which analog optical signals are transmitted from the ground station device 100 to N ground antenna devices 200. Uplink communication from the on-board station 300 to the base station apparatus is the reverse process of downlink communication. Each embodiment can also be applied to a base station apparatus in which analog optical signals are transmitted from N ground antenna devices 200 to the ground station device 100. The following embodiments provide examples in which the number of reference clock signals is one. However, the number of reference clock signals is not limited to one and may be two or more.

Figure 2:
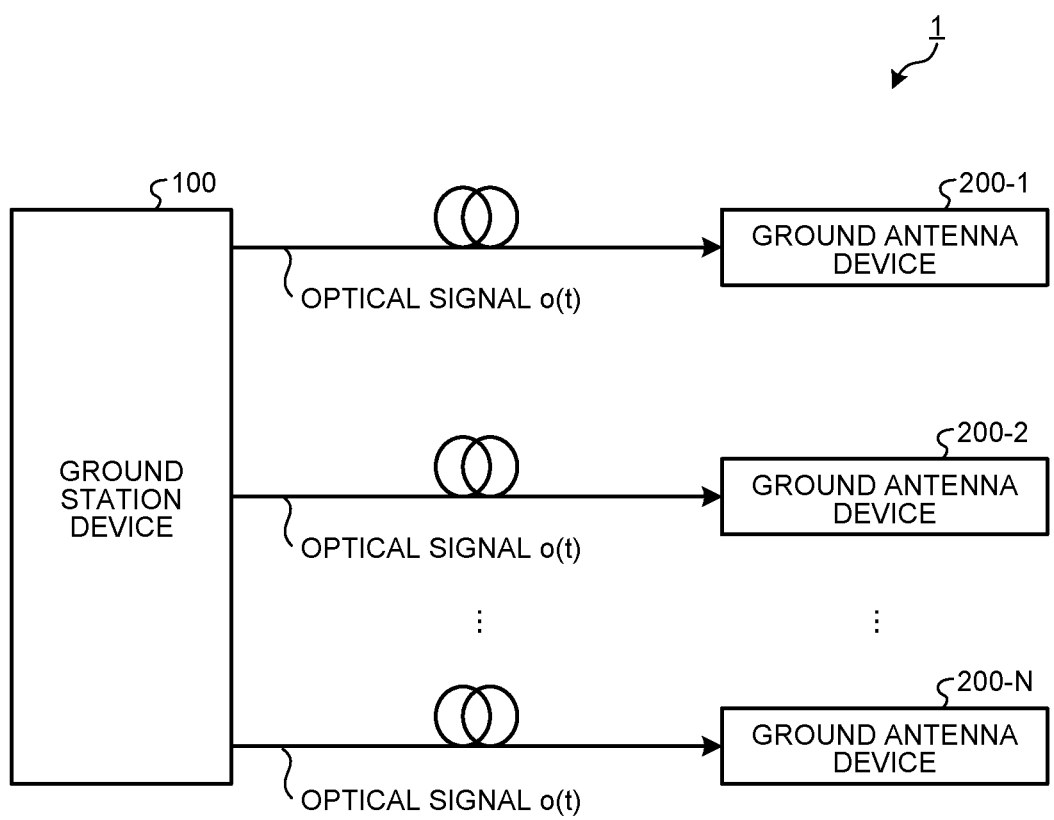
FIG. 2 is a diagram illustrating an exemplary configuration of a base station apparatus according to the first embodiment.

FIG. 2 is a diagram illustrating an exemplary configuration of a base station apparatus 1 according to the first embodiment. The base station apparatus 1 includes one ground station device 100 and N ground antenna devices 200-1 to 200-N. The ground station device 100 and each of the ground antenna devices 200-1 to 200-N are coupled by an optical fiber constituting an optical transmission path. Optical signals o(t) are transmitted to the optical fibers. Here, t is a variable representing time. The optical signals o(t) transmitted from the ground station device 100 are the same regardless of the ground antenna devices 200-1 to 200-N. That is, the ground antenna devices 200-1 to 200-N constituting the one base station apparatus 1 transmit identical signals. The following description focuses on the ground station device 100 and one ground antenna device 200 as a representative of the ground antenna devices 200.

Figure 3:
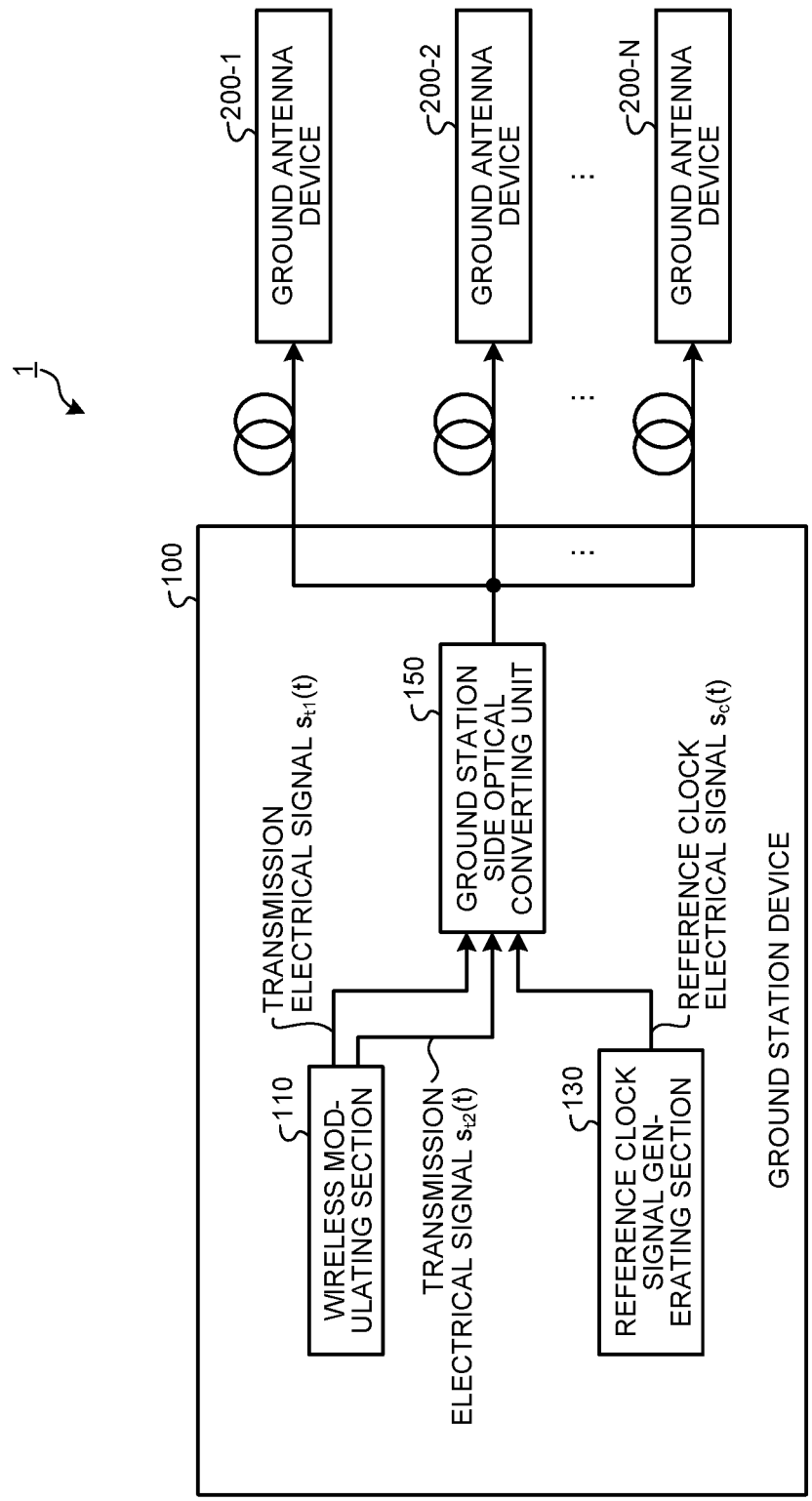
FIG. 3 is a diagram illustrating an exemplary configuration of a ground station device according to the first embodiment.

FIG. 3 is a diagram illustrating an exemplary configuration of the ground station device 100 according to the first embodiment. The ground station device 100 includes a wireless modulating section 110 which is a transmission electrical signal generating section, a reference clock signal generating section 130, and a ground station side optical converting unit 150 which is an electrical-optical converting section. The present embodiment deals with two independent signals which are subjected to frequency multiplexing at two different frequencies as examples of signals to be wirelessly transmitted. However, the number of signals to be wirelessly transmitted is not limited to two and may be one or three or more. A plurality of wireless signals may be transmitted using space multiplexing instead of frequency multiplexing.

The wireless modulating section 110 generates two analog electrical signals to be subjected to frequency multiplexing and wirelessly transmitted, and outputs them to the ground station side optical converting unit 150 as transmission electrical signals $s_{t1}(t)$ and $s_{t2}(t)$. Here, the transmission electrical signals $s_{t1}(t)$ and $s_{t2}(t)$ are baseband signals or IF band signals. In a case where the wireless transmission system applied to the communication between the ground antenna device 200 and the on-board station 300 is a digital system, the transmission electrical signals $s_{t1}(t)$ and $s_{t2}(t)$ are analog electrical signals obtained through digital-analog conversion. The reference clock signal generating section 130 generates a sine- or rectangular-wave analog periodic signal, and outputs the signal to the ground station side optical converting unit 150 as a reference clock electrical signal $s_c(t)$. Here, the reference clock electrical signal $s_c(t)$ is a periodic signal of 10 MHz or more.

Figure 4:
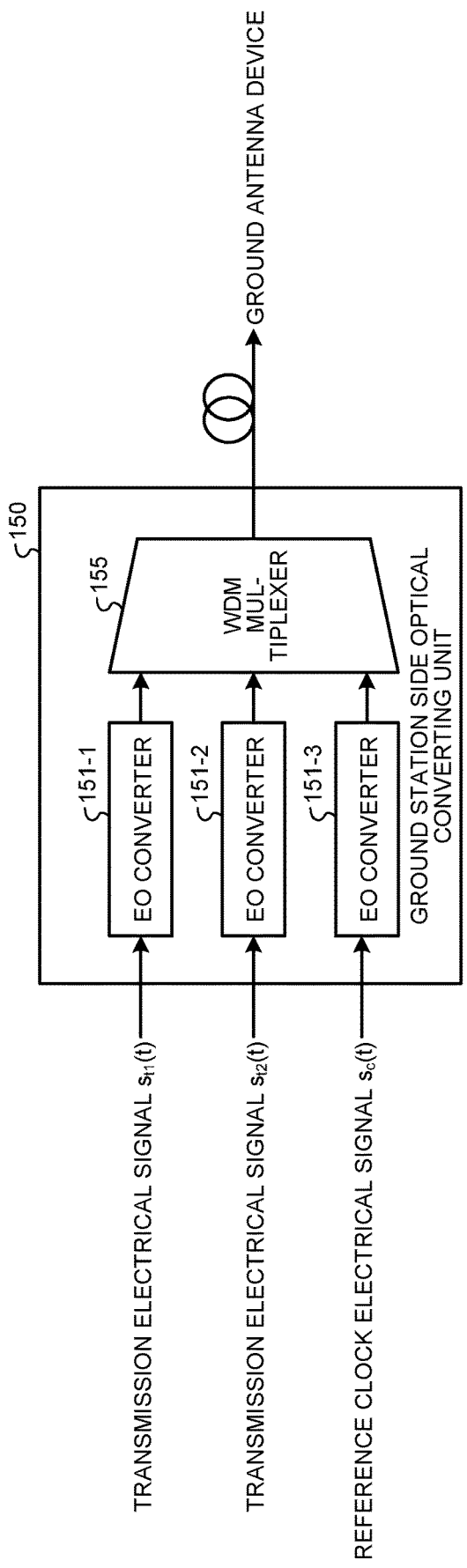
FIG. 4 is a diagram illustrating an exemplary configuration of a ground station side optical converting unit according to the first embodiment.

FIG. 4 is a diagram illustrating an exemplary configuration of the ground station side optical converting unit 150 according to the first embodiment. The ground station side optical converting unit 150 includes electrical-optical (EO) converters 151-1 to 151-3 and a wavelength division multiplex (WDM) multiplexer 155. The transmission electrical signal $s_{t1}(t)$ is input to the EO converter 151-1, and the transmission electrical signal $s_{t2}(t)$ is input to the EO converter 151-2. The reference clock electrical signal $s_c(t)$ is input to the EO converter 151-3.

The EO converters 151-1 to 151-3 perform electrical-optical conversion on the input transmission electrical signals $s_{t1}(t)$ and $s_{t2}(t)$ and the reference clock electrical signal $s_c(t)$, respectively. Note that electrical-optical conversion is the process of converting an electrical signal to an optical signal. The EO converters 151-1 to 151-3 output optical signals with wavelengths of $\lambda_1$, $\lambda_2$, and $\lambda_3$, respectively. The WDM multiplexer 155 multiplexes the three signals obtained through electrical-optical conversion using WDM, that is, wavelength division multiplexing, and outputs the analog optical signal o(t) with the multiplexed three wavelengths to the optical fiber. The optical signal o(t) output from the WDM multiplexer 155 of the ground station side optical converting unit 150 to the optical fiber is distributed to the N ground antenna devices 200-1 to 200-N as illustrated in FIG. 3.

Figure 5:
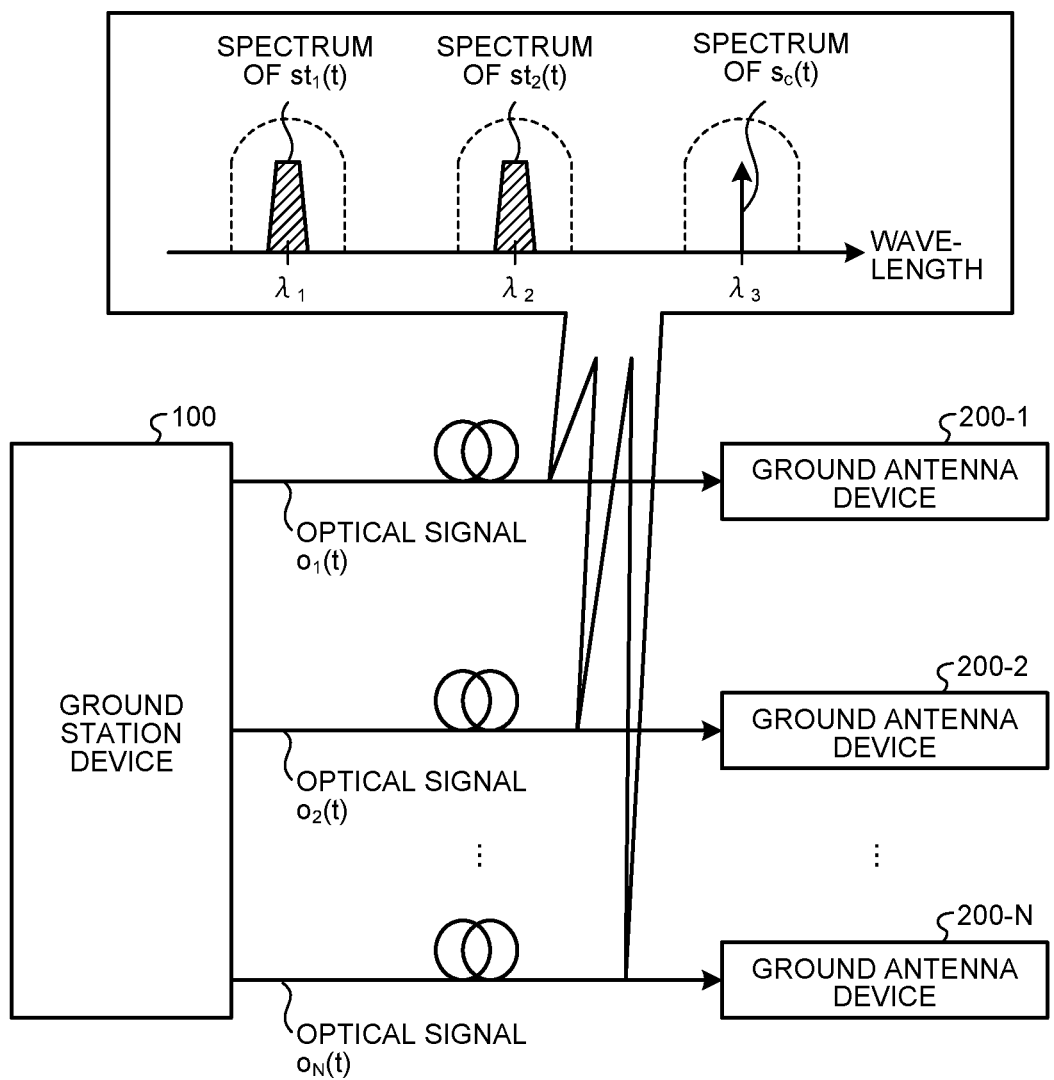
FIG. 5 is a diagram schematically illustrating the optical spectra of optical signals transmitted on the optical fibers between the ground station device and ground antenna devices according to the first embodiment.

FIG. 5 is a diagram schematically illustrating the optical spectra of the optical signals o(t) transmitted on the optical fibers between the ground station device 100 and the ground antenna devices 200-1 to 200-N according to the first embodiment. The optical signals transmitted from the ground station device 100 to the ground antenna devices 200-1 to 200-N are the same, but for the sake of convenience, these are distinguished from one another in FIG. 5 as the optical signals $o_1(t)$ to $o_N(t)$. The optical signals $o_1(t)$ to $o_N(t)$ are WDM signals containing transmission optical signals with three different optical wavelengths $\lambda_1$, $\lambda_2$, and $\lambda_3$. Each of the optical signals $o_1(t)$ to $o_N(t)$ carries the transmission electrical signals $s_{t1}(t)$ and $s_{t2}(t)$ and the reference clock electrical signal $s_c(t)$ subjected to electrical-optical conversion. Note that the order of the optical wavelengths is only an example, and the three optical spectra may be arranged in any order. The wavelength intervals between the transmission optical signals to be multiplexed may be unequal.

Figure 6:
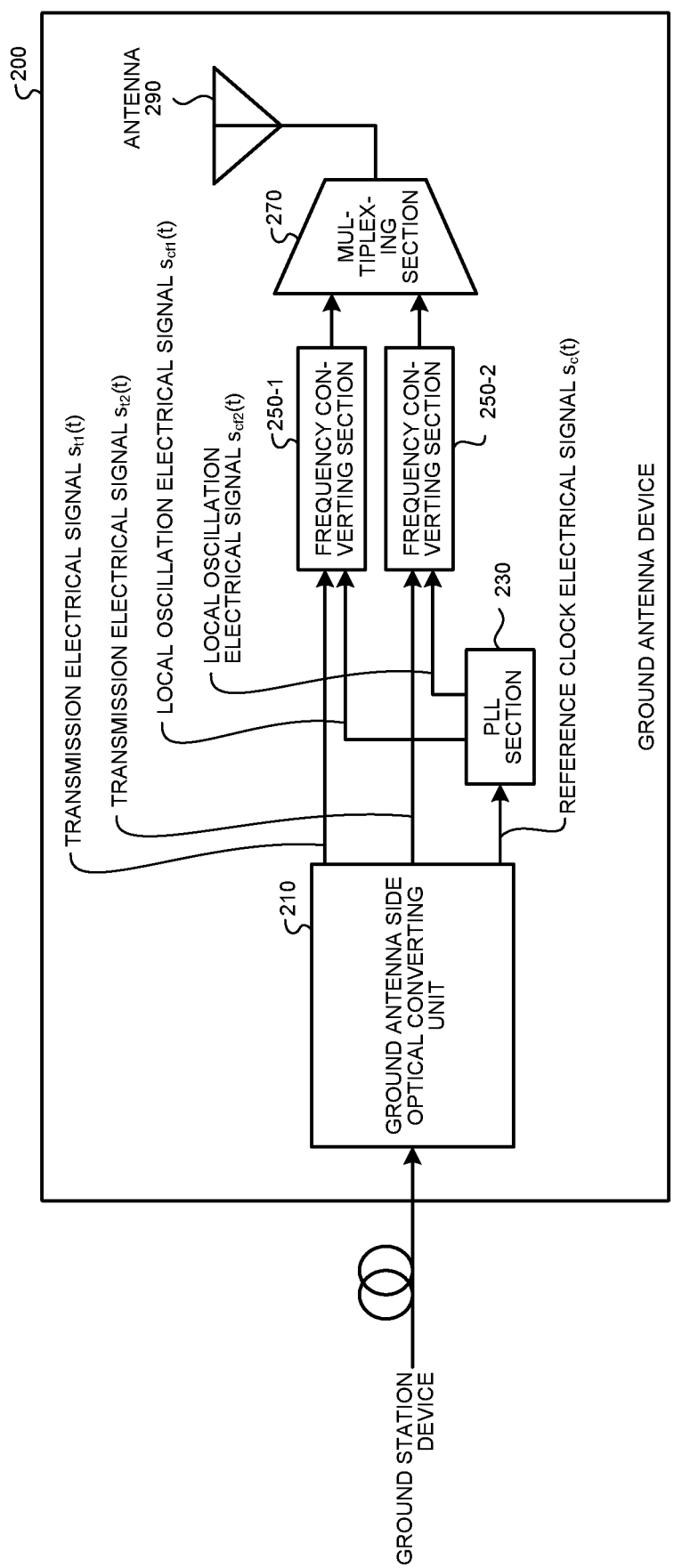
FIG. 6 is a diagram illustrating an exemplary configuration of a ground antenna device according to the first embodiment.

FIG. 6 is a diagram illustrating an exemplary configuration of the ground antenna device 200 according to the first embodiment. The ground antenna device 200 includes a ground antenna side optical converting unit 210 which is an optical-electrical converting section, a phase locked loop (PLL) section 230, frequency converting sections 250-1 and 250-2, a multiplexing section 270, and an antenna 290. The frequency converting sections 250-1 and 250-2 have the same internal configuration. The PLL section 230 and the frequency converting sections 250-1 and 250-2 constitute a frequency conversion processing section. When the frequency converting section 250-1 and the frequency converting section 250-2 are not distinguished from each other, they are referred to as the frequency converting section 250.

Figure 7:
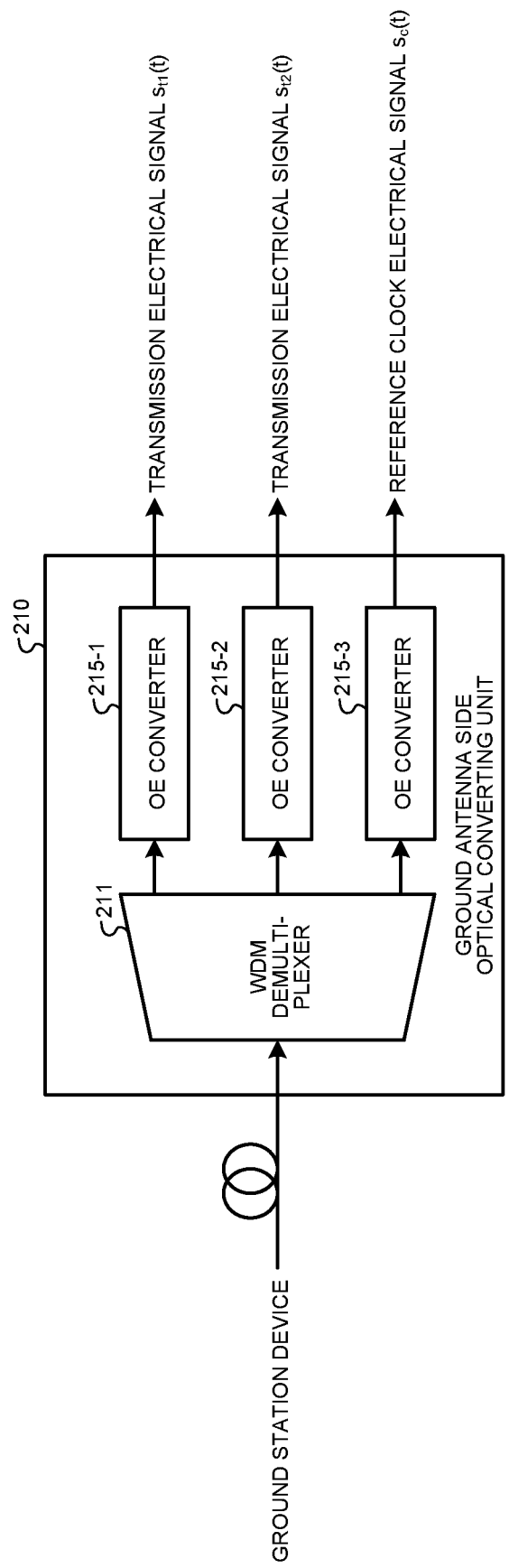
FIG. 7 is a diagram illustrating an exemplary configuration of a ground antenna side optical converting unit illustrated in FIG. 6.

FIG. 7 is a diagram illustrating an exemplary configuration of the ground antenna side optical converting unit 210 illustrated in FIG. 6. The ground antenna side optical converting unit 210 includes a WDM demultiplexer 211 and optical-electrical (OE) converters 215-1 to 215-3.

In the ground antenna side optical converting unit 210, the WDM demultiplexer 211 demultiplexes the optical signal o(t) transmitted from the ground station device 100 by wavelength, and outputs the optical signals with different wavelengths to the OE converters 215-1 to 215-3. The OE converters 215-1 to 215-3 perform optical-electrical conversion on the optical signals input from the WDM demultiplexer 211 to convert the optical signals to electrical signals. The OE converter 215-1 performs optical-electrical conversion on the input optical signal to take the transmission electrical signal $s_{t1}(t)$. The OE converter 215-2 performs optical-electrical conversion on the input optical signal to take the transmission electrical signal $s_{t2}(t)$. The OE converter 215-3 performs optical-electrical conversion on the input optical signal to take the reference clock electrical signal $s_c(t)$. Among them, the reference clock electrical signal $s_c(t)$ is input to the PLL section 230 illustrated in FIG. 6, and local oscillation electrical signals $s_{cf1}(t)$ and $s_{cf2}(t)$ are generated by the PLL section 230 which is a phase synchronization circuit. The local oscillation electrical signals $s_{cf1}(t)$ and $s_{cf2}(t)$ are both sine-wave signals with local oscillation frequencies for respectively converting the frequency of the transmission electrical signals $s_{t1}(t)$ and $s_{t2}(t)$ to the RF band. The local oscillation electrical signal $s_{cf1}(t)$ is input to the frequency converting section 250-1, and the local oscillation electrical signal $s_{cf2}(t)$ is input to the frequency converting section 250-2.

Figure 8:
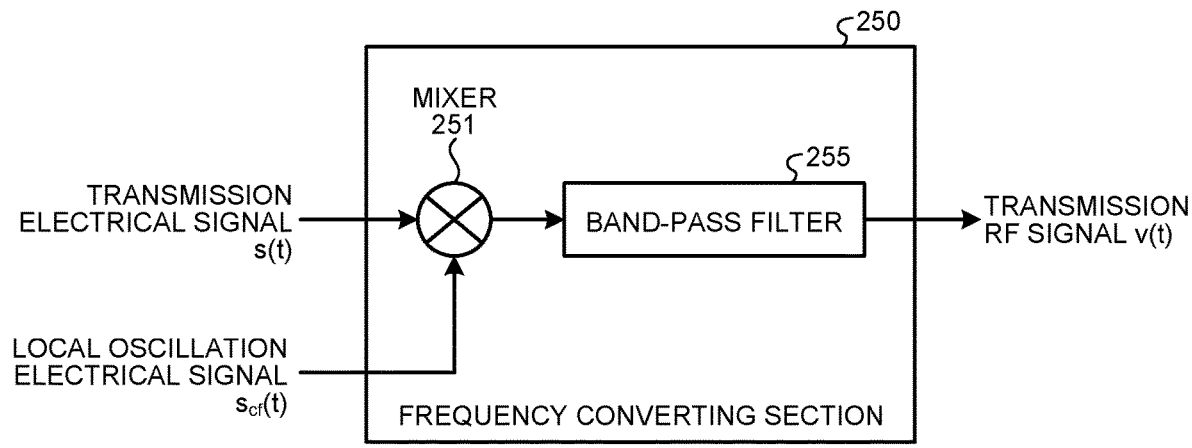
FIG. 8 is a diagram illustrating an exemplary configuration of a frequency converting section illustrated in FIG. 6.

FIG. 8 is a diagram illustrating an exemplary configuration of the frequency converting sections 250-1 and 250-2 illustrated in FIG. 6. Because the frequency converting sections 250-1 and 250-2 have the same configuration, one of them is depicted as the frequency converting section 250 in FIG. 8. In FIG. 8, input signals to the frequency converting section 250 are a transmission electrical signal s(t) and a local oscillation electrical signal $s_{cf}(t)$. The frequency converting section 250 includes a mixer 251 and a band-pass filter 255. The transmission electrical signal s(t) and the local oscillation electrical signal $s_{cf}(t)$ are input to the mixer 251. The mixer 251 up-converts the frequency of the transmission electrical signal s(t) by multiplying the transmission electrical signal s(t) by the local oscillation electrical signal $s_{cf}(t)$, and outputs the up-converted transmission electrical signal s(t) to the band-pass filter 255. The band-pass filter 255 removes unnecessary frequency components from the input signal to generate a transmission electrical signal with a converted frequency in the RF band. The band-pass filter 255 outputs the frequency-converted transmission electrical signal to the multiplexing section 270 illustrated in FIG. 6 as a transmission RF signal v(t).

Figure 9:
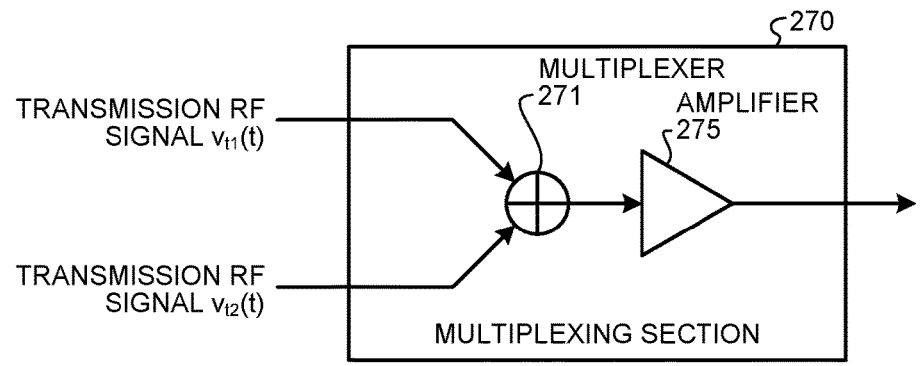
FIG. 9 is a diagram illustrating an exemplary configuration of a multiplexing section illustrated in FIG. 6.

FIG. 9 is a diagram illustrating an exemplary configuration of the multiplexing section 270 illustrated in FIG. 6. The multiplexing section 270 includes a multiplexer 271 and an amplifier 275. Transmission RF signals $v_{r1}(t)$ and $v_{r2}(t)$ respectively output from the frequency converting sections 250-1 and 250-2 are input to the multiplexer 271. The multiplexer 271 performs frequency multiplexing on the two transmission RF signals $v_{r1}(t)$ and $v_{r2}(t)$ input, and outputs the resultant signal to the amplifier 275. The amplifier 275 amplifies the signal input from the multiplexer 271 and outputs the amplified signal to the antenna 290.

As described above, the frequency converting sections 250-1 and 250-2 up-convert the input signals using the local oscillation electrical signals $s_{cf1}(t)$ and $s_{cf2}(t)$ generated by the PLL section 230 to convert the frequency of the input signals to the RF band. Here, the clock signal which the PLL section 230 refers to when generating local oscillation electrical signals is the reference clock electrical signal $s_c(t)$ transmitted from the ground station device 100. The reference clock electrical signal $s_c(t)$ is shared by the N ground antenna devices 200-1 to 200-N. Therefore, accurate radio frequency synchronization can be achieved among different ground antenna devices.

Figure 10:
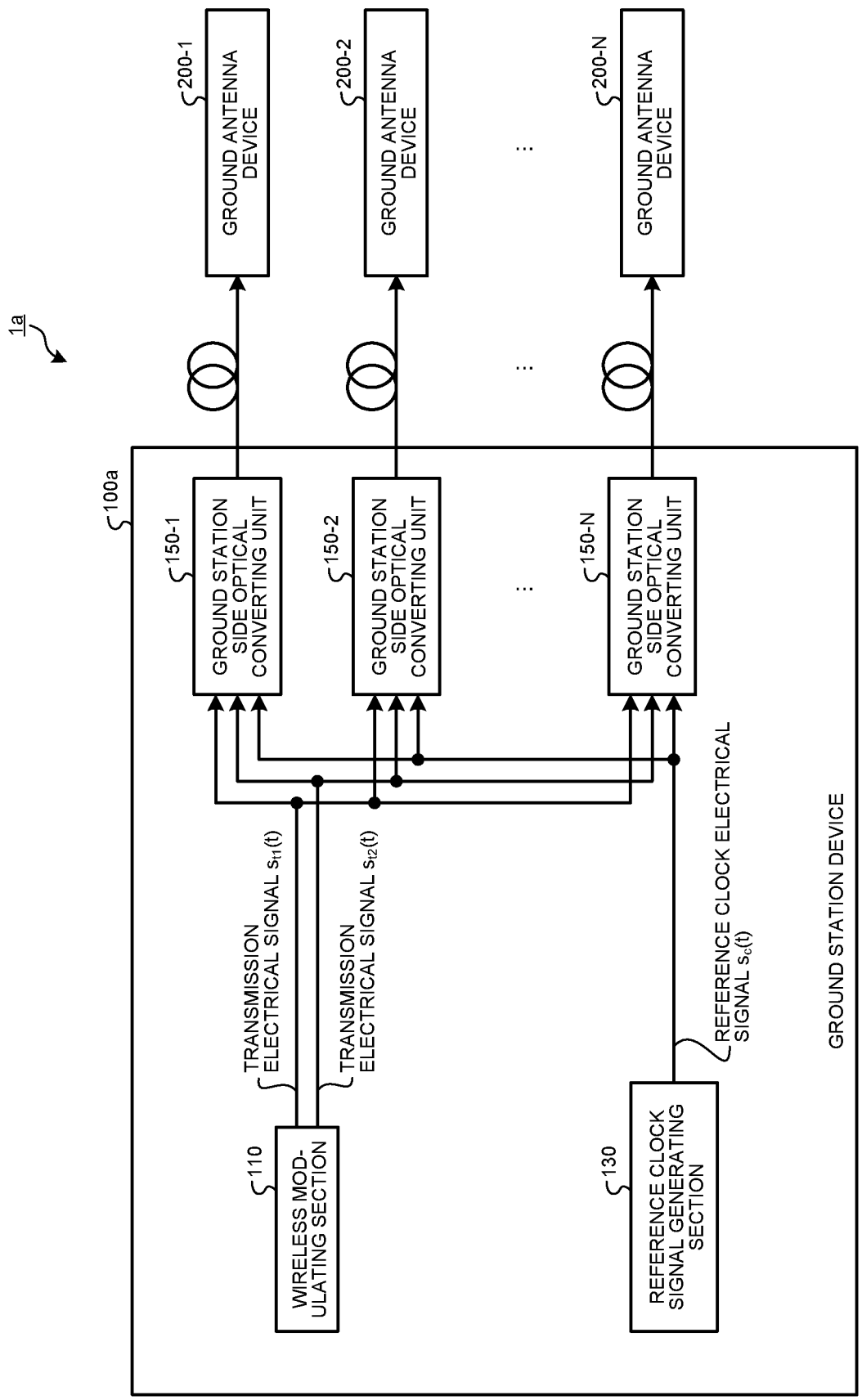
FIG. 10 is a diagram illustrating an exemplary configuration of a base station apparatus capable of achieving the same effect as the base station apparatus configured as illustrated in FIG. 2.

FIG. 10 is a diagram illustrating an exemplary configuration of a base station apparatus 1a capable of achieving the same effect as the base station apparatus 1 configured as illustrated in FIG. 2. The base station apparatus 1a includes a ground station device 100a in place of the ground station device 100 of the base station apparatus 1. The ground antenna devices 200-1 to 200-N of the base station apparatus 1a are the same as the ground antenna devices 200-1 to 200-N of the base station apparatus 1. The ground station device 100a includes the wireless modulating section 110, the reference clock signal generating section 130, and ground station side optical converting units 150-1 to 150-N.

As illustrated in FIG. 3, the ground station device 100 of the base station apparatus 1 is configured to distribute the optical signal obtained through conversion at the ground station side optical converting unit 150 to the N ground antenna devices 200-1 to 200-N. On the other hand, as illustrated in FIG. 10, the ground station device 100a is configured to distribute each of the electrical signals $s_{t1}(t)$, $s_{t2}(t)$ and $s_c(t)$ to the N ground station side optical converting units 150-1 to 150-N, and then convert the distributed signals to optical signals at the N ground station side optical converting units 150-1 to 150-N. Because the ground station side optical converting units 150-1 to 150-N each have the same configuration as the ground station side optical converting unit 150 illustrated in FIG. 4, the descriptions thereof are omitted.

As described above, according to the present embodiment, in the base station apparatuses 1 and 1a based on the analog optical RoF technique, the ground station devices 100 and 100a perform WDM on signals to be transmitted to a mobile station and a reference clock signal and transmit the multiplexed signal to the plurality of ground antenna devices 200. The ground antenna devices 200 each convert the signals to be transmitted to the mobile station to radio frequency band signals using the reference clock signal. Consequently, the frequencies of the wireless signals that are transmitted from the plurality of ground antenna devices 200 to the mobile station can be accurately synchronized.

Second Embodiment

Figure 11:
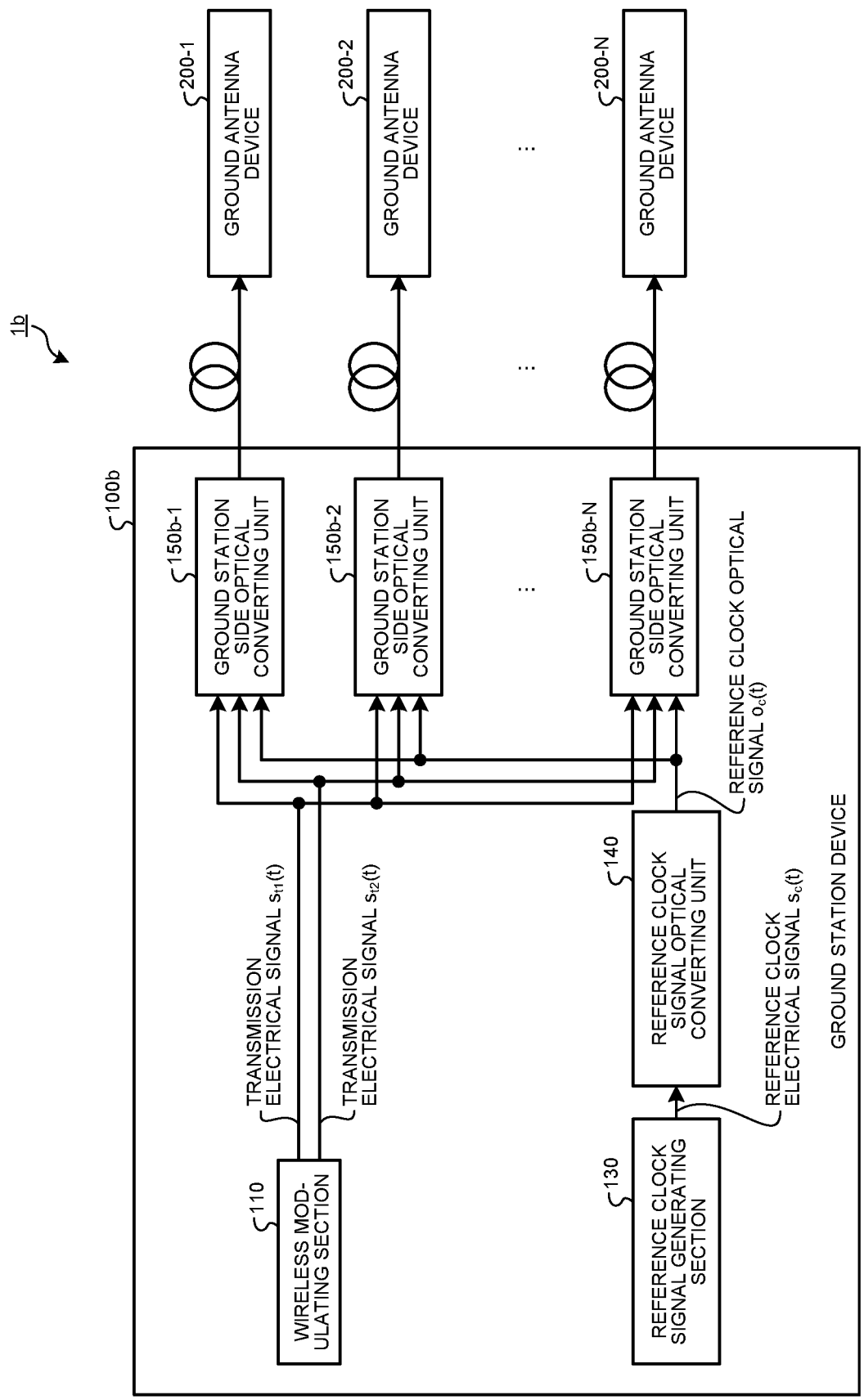
FIG. 11 is a diagram illustrating an exemplary configuration of a ground station device according to a second embodiment.

FIG. 11 is a diagram illustrating an exemplary configuration of a ground station device 100b according to the second embodiment. Note that a base station apparatus including the ground station device 100b is referred to as the base station apparatus 1b.

The base station apparatus 1b according to the present embodiment is obtained by replacing the ground station device 100a of the base station apparatus 1a described in the first embodiment with the ground station device 100b. The ground station device 100b includes the wireless modulating section 110, the reference clock signal generating section 130, a reference clock signal optical converting unit 140, and ground station side optical converting units 150b-1 to 150b-N. The ground station side optical converting units 150b-1 to 150b-N have the same configuration. Because the wireless modulating section 110 and the reference clock signal generating section 130 are respectively the same as the wireless modulating section 110 and the reference clock signal generating section 130 of the ground station devices 100 and 100a described in the first embodiment, the descriptions thereof are omitted.

The ground station device 100b differs from the ground station device 100a in that the transmission electrical signals $s_{t1}(t)$ and $s_{t2}(t)$ are distributed to the N ground station side optical converting units 150b-1 to 150b-N in the state of electrical signals, but the reference clock signal is distributed to the N ground station side optical converting units 150b-1 to 150b-N after being subjected to electrical-optical conversion. The differences from the first embodiment, particularly from the ground station device 100a, will be mainly described below.

Figure 12:
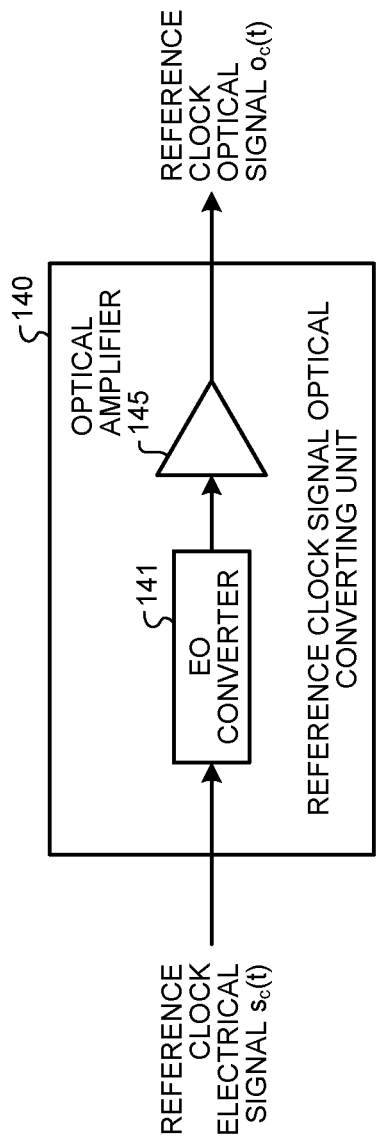
FIG. 12 is a diagram illustrating an exemplary configuration of a reference clock signal optical converting unit illustrated in FIG. 11.

FIG. 12 is a diagram illustrating an exemplary configuration of the reference clock signal optical converting unit 140. The reference clock signal optical converting unit 140 includes an EO converter 141 and an optical amplifier 145. The reference clock signal optical converting unit 140 is a converting section that performs electrical-optical conversion on the reference clock signal. The EO converter 141 performs electrical-optical conversion on the reference clock electrical signal $s_c(t)$ input from the reference clock signal generating section 130 and outputs the resultant signal to the optical amplifier 145. The optical amplifier 145 amplifies the optical signal input from the EO converter 141 and outputs the amplified optical signal as a reference clock optical signal $o_c(t)$. The reference clock optical signal $o_c(t)$ output from the reference clock signal optical converting unit 140 is distributed to the N ground station side optical converting units 150b-1 to 150b-N. Because the reference clock electrical signal $s_c(t)$ is converted to the reference clock optical signal $o_c(t)$, which is an optical signal, and then distributed to the N ground station side optical converting units 150b-1 to 150b-N, the present embodiment can ensure higher consistency between the reference clock signals transmitted to the ground antenna devices 200 and achieve more accurate frequency synchronization than the first embodiment.

Figure 13:
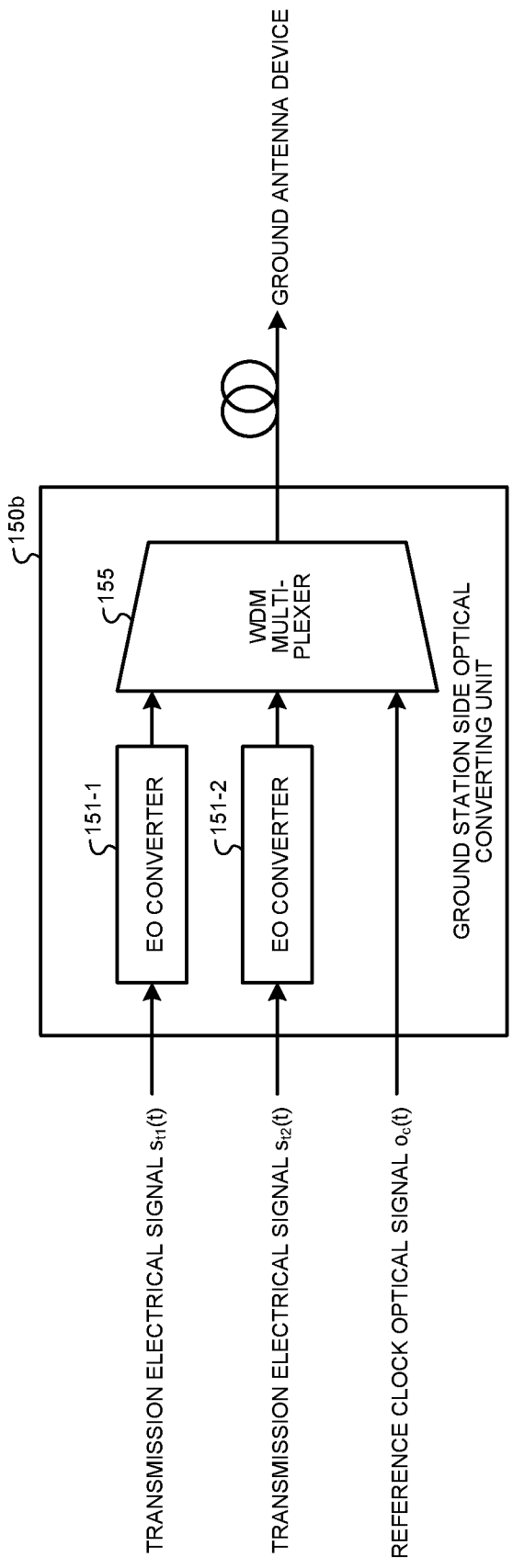
FIG. 13 is a diagram illustrating an exemplary configuration of a ground station side optical converting unit illustrated in FIG. 11.

FIG. 13 is a diagram illustrating an exemplary configuration of the ground station side optical converting units 150b-1 to 150b-N. Because the N ground station side optical converting units 150b-1 to 150b-N have the same configuration, one of them is depicted as the ground station side optical converting unit 150b in FIG. 13. The ground station side optical converting unit 150b includes the EO converters 151-1 and 151-2 and the WDM multiplexer 155. The transmission electrical signal $s_{t1}(t)$ is input to the EO converter 151-1, and the transmission electrical signal $s_{t2}(t)$ is input to the EO converter 151-2. To the WDM multiplexer 155, the signal output from the EO converter 151-1, the signal output from the EO converter 151-2, and the reference clock optical signal $o_c(t)$ are input. Here, the transmission electrical signals $s_{t1}(t)$ and $s_{t2}(t)$ are distributed in advance to the N ground station side optical converting units 150b-1 to 150b-N as illustrated in FIG. 11.

The EO converter 151-1 performs electrical-optical conversion on the input transmission electrical signal $s_{t1}(t)$ and outputs the resultant signal to the WDM multiplexer 155. The EO converter 151-2 performs electrical-optical conversion on the input transmission electrical signal $s_{t2}(t)$ and outputs the resultant signal to the WDM multiplexer 155. The WDM multiplexer 155 performs wavelength division multiplexing on the three optical signals including the reference clock optical signal $o_c(t)$, that is, the three optical signals input, and outputs the resultant signal to the ground antenna device 200.

As described above, according to the present embodiment, in the base station apparatus 1 based on the analog optical RoF technique, prior to performing WDM on signals to be transmitted to a mobile station and a reference clock signal and transmitting the multiplexed signal to the N ground antenna devices 200, the ground station device 100b converts the reference clock electrical signal to an optical signal and then distributes the optical signal to the N ground station side optical converting units. This configuration can ensure higher consistency between the reference clock signals transmitted to a plurality of different ground antenna devices than the configuration in which a reference clock electrical signal is distributed to N ground station side optical converting units. Therefore, the frequencies of the wireless signals that are transmitted from the plurality of ground antenna devices 200 to the mobile station can be accurately synchronized.

Third Embodiment

Figure 14:
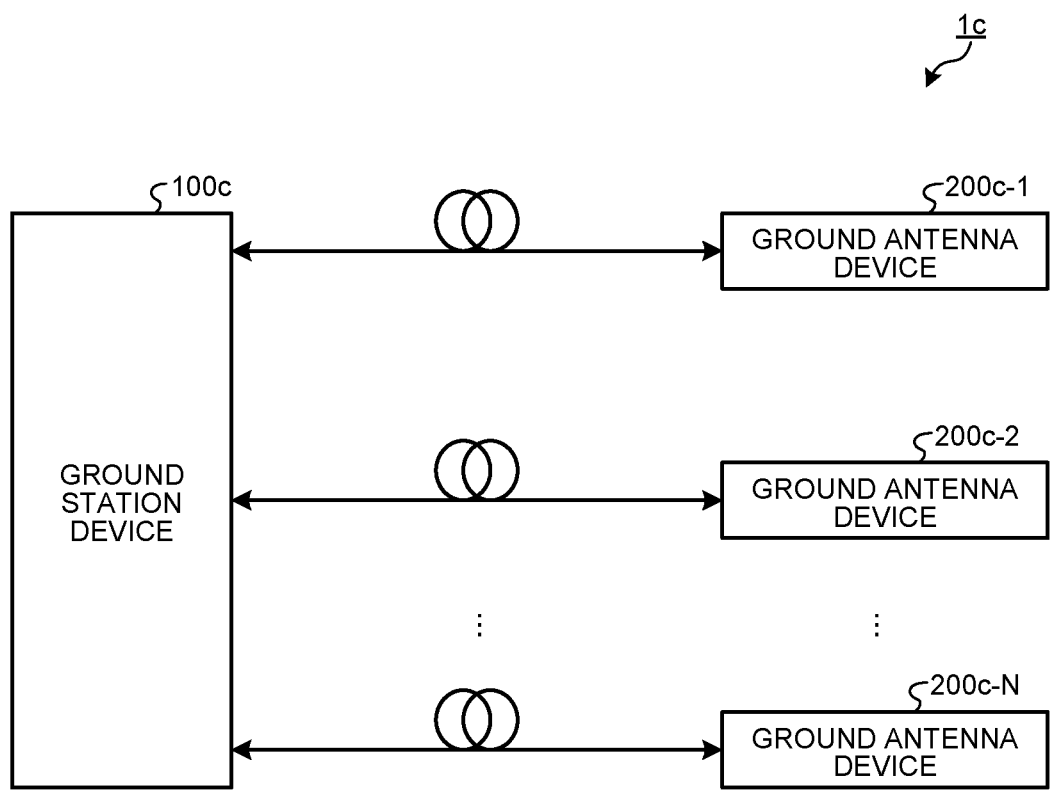
FIG. 14 is a diagram illustrating an exemplary configuration of a base station apparatus according to a third embodiment.

FIG. 14 is a diagram illustrating an exemplary configuration of a base station apparatus 1c according to the third embodiment. The base station apparatus 1c includes one ground station device 100c and N ground antenna devices 200c-1 to 200c-N. The ground station device 100c and each of the ground antenna devices 200c-1 to 200c-N are coupled by an optical fiber. The base station apparatus 1c according to the present embodiment differs from the base station apparatuses according to the first and second embodiments in that uplink transmission from an on-board station to the base station apparatus is performed in addition to downlink transmission from the base station apparatus to the on-board station, and both downlink and uplink transmission signals are subjected to WDM transmission in the optical fiber section. The differences from the first and second embodiments will be mainly described below. Note that the ground antenna devices 200c-1 to 200c-N have the same configuration. In the following description, when the ground antenna devices 200c-1 to 200c-N are not distinguished from one another, they are referred to as the ground antenna device 200c.

Figure 15:
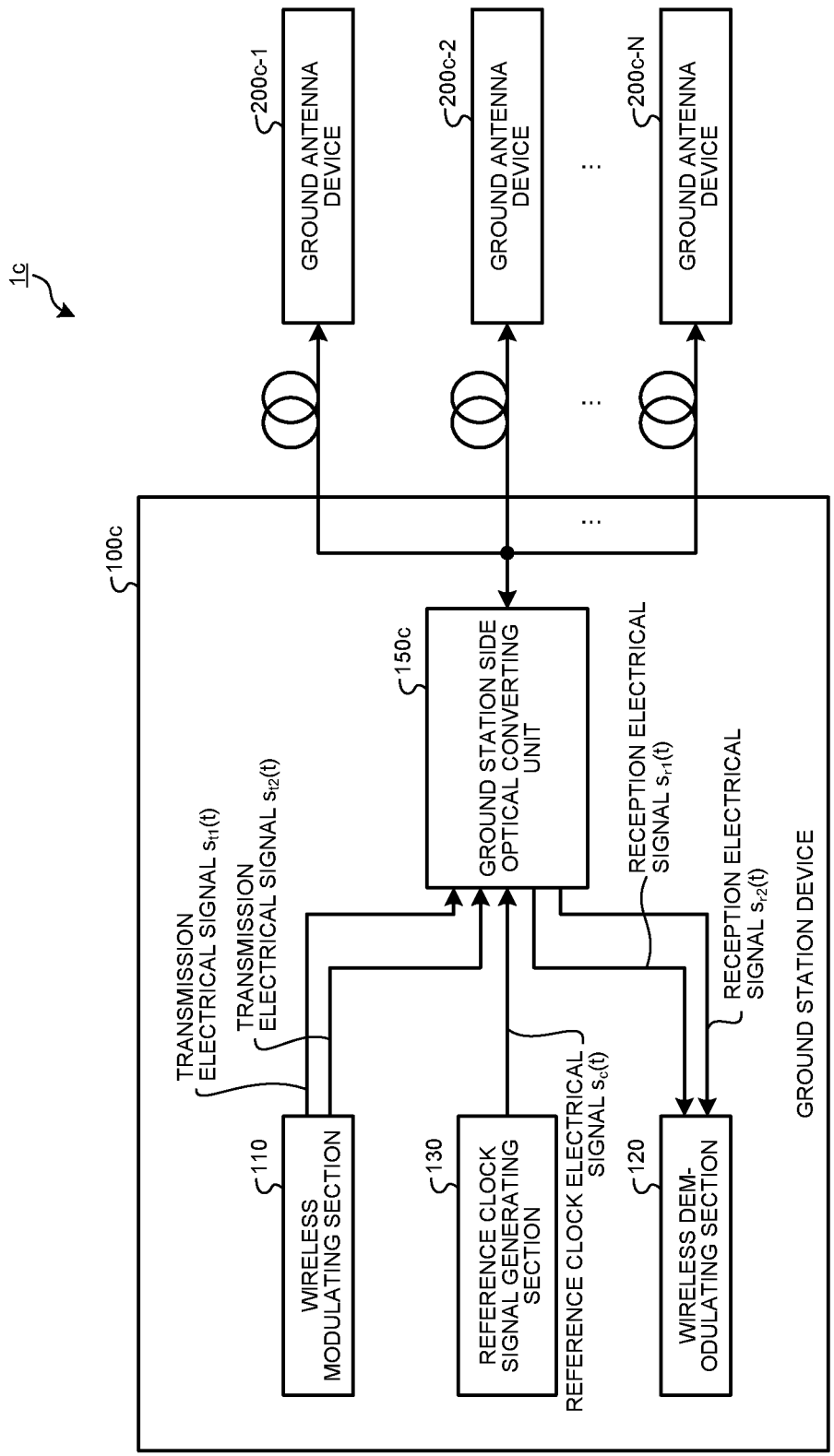
FIG. 15 is a diagram illustrating a configuration of a ground station device according to the third embodiment.

FIG. 15 is a diagram illustrating a configuration of the ground station device 100c according to the third embodiment. The ground station device 100c includes the wireless modulating section 110, a wireless demodulating section 120, the reference clock signal generating section 130, and a ground station side optical converting unit 150c. The wireless modulating section 110 and the reference clock signal generating section 130 are respectively the same as the wireless modulating section 110 and the reference clock signal generating section 130 of the ground station device 100 according to the first embodiment illustrated in FIG. 3. The wireless demodulating section 120 demodulates reception electrical signals $s_{r1}(t)$ and $s_{r2}(t)$ input from the ground station side optical converting unit 150c. The reception electrical signals $s_{r1}(t)$ and $s_{r2}(t)$ that are input to the wireless demodulating section 120 are analog electrical signals received from an on-board station and subjected to frequency conversion to the baseband or IF band by the ground antenna device 200c. In a case where the wireless transmission system between the ground antenna device 200c and the on-board station is a digital system, the wireless demodulating section 120 performs analog-digital conversion on the reception electrical signals $s_{r1}(t)$ and $s_{r2}(t)$ and then performs demodulation through digital signal processing.

Figure 16:
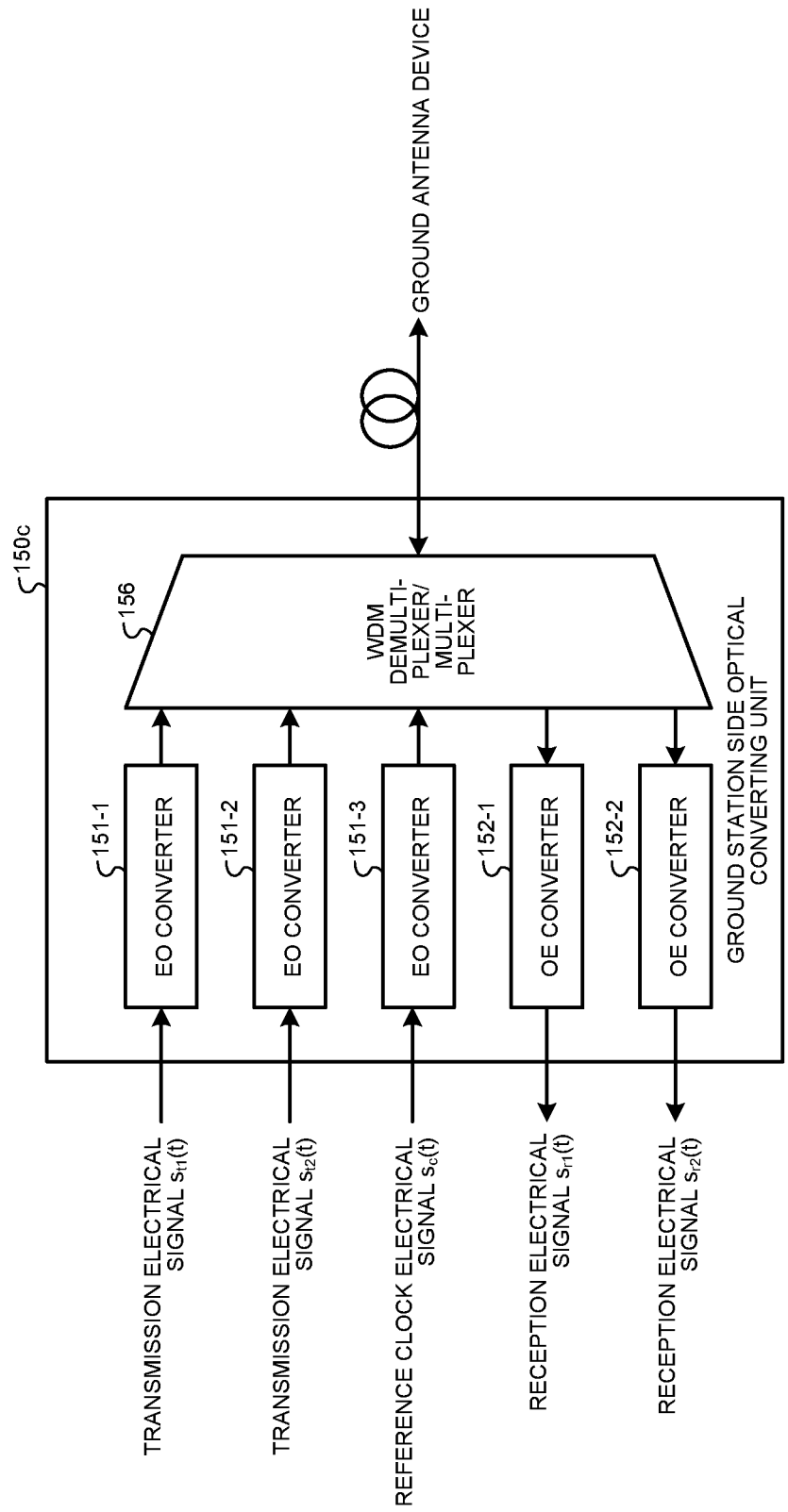
FIG. 16 is a diagram illustrating an exemplary configuration of a ground station side optical converting unit illustrated in FIG. 15.

FIG. 16 is a diagram illustrating an exemplary configuration of the ground station side optical converting unit 150c. The ground station side optical converting unit 150c includes the EO converters 151-1 to 151-3, OE converters 152-1 and 152-2, and a WDM demultiplexer/multiplexer 156. The EO converters 151-1 to 151-3 are the same as the EO converters 151-1 to 151-3 of the ground station side optical converting unit 150 described in the first embodiment. Here, the transmission direction of the transmission electrical signals $s_{t1}(t)$ and $s_{t2}(t)$ and the reference clock electrical signal $s_c(t)$ is the direction from the ground station device 100c to the ground antenna device 200c, and the transmission direction of the reception electrical signals $s_{r1}(t)$ and $s_{r2}(t)$ is the direction from the ground antenna device 200c to the ground station device 100c.

The electrical signals $s_{t1}(t)$, $s_{t2}(t)$, and $s_c(t)$ are converted to optical signals in the EO converters 151-1 to 151-3, respectively.

The WDM demultiplexer/multiplexer 156 performs demultiplexing and multiplexing for five different optical wavelengths. Specifically, the WDM demultiplexer/multiplexer 156 performs wavelength division multiplexing on the three transmission optical signals input from the EO converters 151-1 to 151-3 and outputs the resultant signal to the ground antenna device 200c. The WDM demultiplexer/multiplexer 156 also demultiplexes an optical signal input from the ground antenna device 200c, i.e. two reception optical signals subjected to wavelength division multiplexing, into the two reception optical signals. The two reception optical signals obtained as the result of demultiplexing in the WDM demultiplexer/multiplexer 156 are input to the OE converters 152-1 and 152-2.

The OE converters 152-1 and 152-2 perform optical-electrical conversion on the reception optical signals input from the WDM demultiplexer/multiplexer 156 to convert them to electrical signals, and output the electric signals as the reception electrical signals $s_{r1}(t)$ and $s_{r2}(t)$ to the wireless demodulating section 120.

Figure 17:
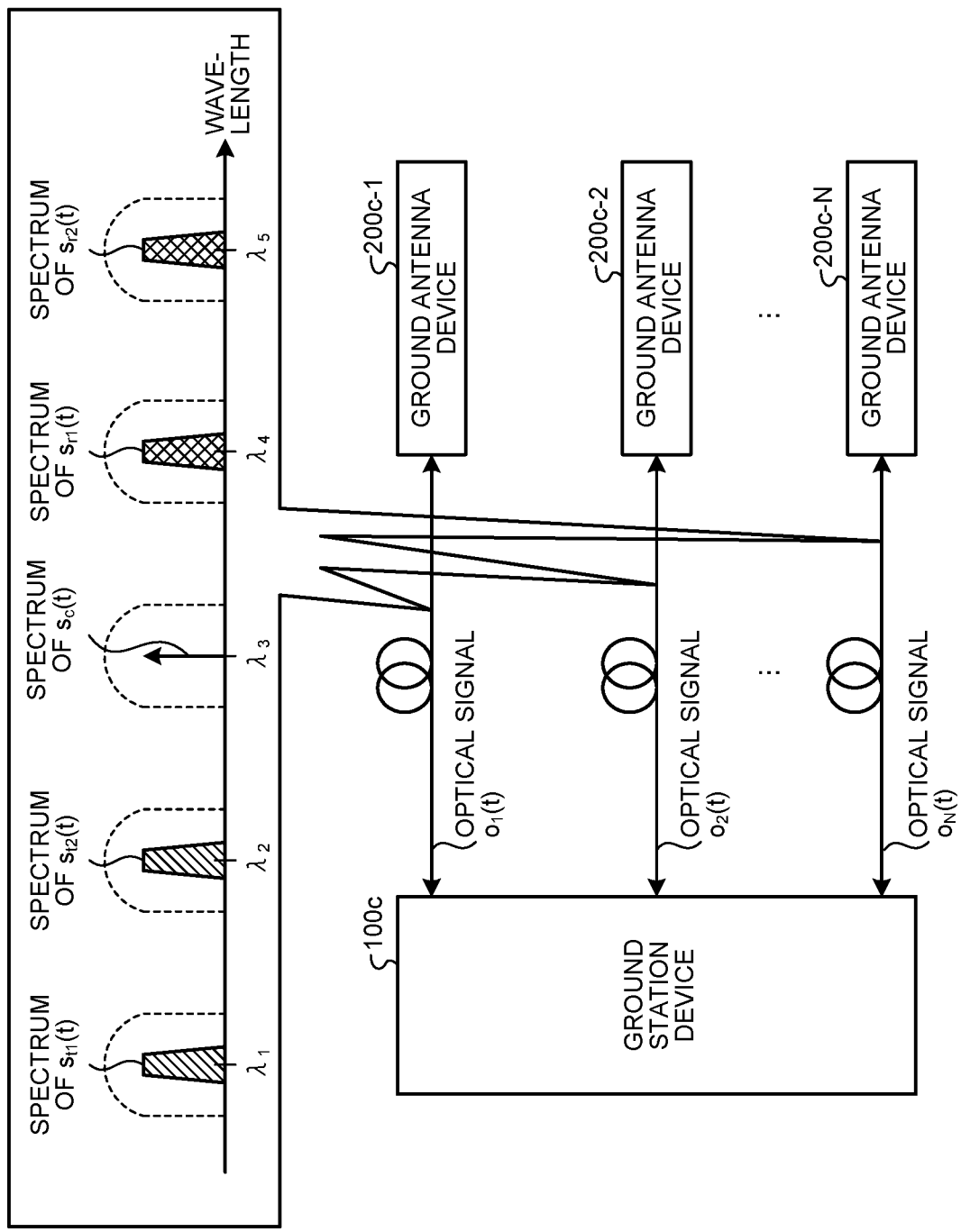
FIG. 17 is a diagram schematically illustrating the optical spectra of optical signals transmitted on the optical fibers between the ground station device and ground antenna devices according to the third embodiment.

FIG. 17 is a diagram schematically illustrating the optical spectra of the optical signals o(t) transmitted on the optical fibers between the ground station device 100c and the ground antenna devices 200c-1 to 200c-N according to the third embodiment. In FIG. 17, the optical signals transmitted between the ground station device 100c and the ground antenna devices 200c-1 to 200c-N are distinguished from one another as $o_1(t)$ to $o_N(t)$. In FIG. 17, the wavelengths that are subjected to wavelength division multiplexing and transmitted as the optical signals $o_1(t)$ to $o_N(t)$ are $\lambda_1$, $\lambda_2$, $\lambda_3$, $\lambda_4$, and $\lambda_5$. The original electrical signals of the five optical signals subjected to wavelength division multiplexing are $s_{t1}(t)$, $s_{t2}(t)$, $s_c(t)$, $s_{r1}(t)$, and $s_{r2}(t)$. Note that, unlike in the first and second embodiments, an uplink signal received at each ground antenna device 200c also passes on the optical fiber in the present embodiment. Even in the case of an uplink signal transmitted from a single on-board station, due to the influence of reflection, diffraction, multipath, and the like in radio wave propagation, the fading state of an uplink signal that is received at each ground antenna device 200c varies from signal to signal, and the fading state of a signal received at each ground antenna device 200c varies from optical fiber to optical fiber. Therefore, in FIG. 17, the optical signals on the optical fibers are depicted as the different signals $o_1(t)$ to $o_N(t)$. The order of the optical wavelengths is only an example, and the five optical spectra may be arranged in any order. The wavelength intervals between the optical signals to be subjected to wavelength division multiplexing may be unequal.

Figure 18:
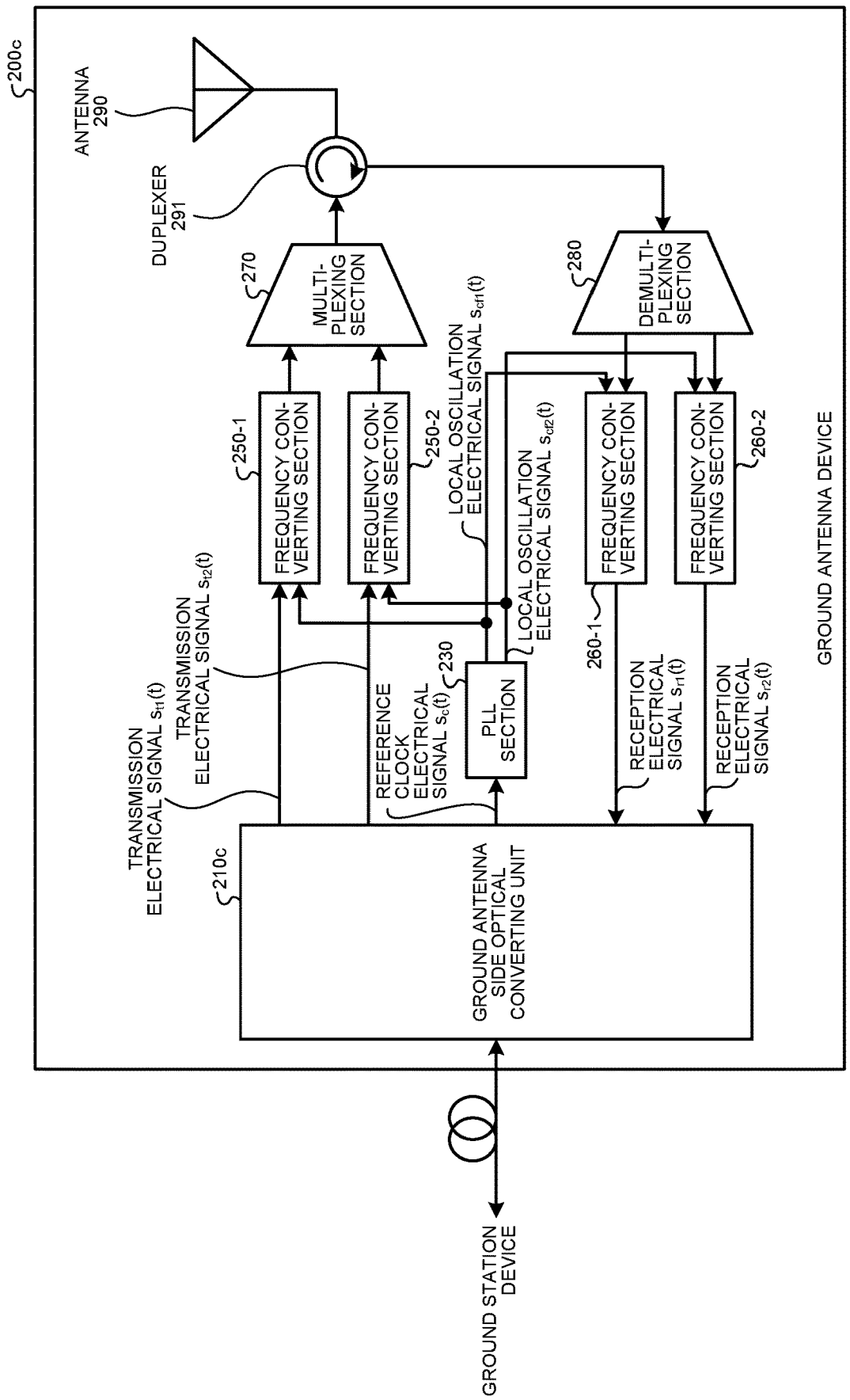
FIG. 18 is a diagram illustrating an exemplary configuration of a ground antenna device according to the third embodiment.

FIG. 18 is a diagram illustrating an exemplary configuration of the ground antenna device 200c according to the third embodiment. The ground antenna device 200c includes a ground antenna side optical converting unit 210c, the PLL section 230, the frequency converting sections 250-1 and 250-2, frequency converting sections 260-1 and 260-2, the multiplexing section 270, a demultiplexing section 280, the antenna 290, and a duplexer 291. The PLL section 230, the frequency converting sections 250-1 and 250-2, the multiplexing section 270, and the antenna 290 are the same as the PLL section 230, the frequency converting sections 250-1 and 250-2, the multiplexing section 270, and the antenna 290 of the ground antenna device 200 according to the first embodiment. The frequency converting sections 260-1 and 260-2 have the same internal configuration. When the frequency converting section 260-1 and the frequency converting section 260-2 are not distinguished from each other, they are referred to as the frequency converting section 260. In the ground antenna device 200c, the frequency converting sections 250-1 and 250-2 constitute a first frequency conversion processing section together with the PLL section 230, and the frequency converting sections 260-1 and 260-2 constitute a second frequency conversion processing section together with the PLL section 230.

The duplexer 291 plays a role in implementing a duplex system for downlink signals transmitted from the ground station device 100c and uplink signals received at the antenna 290, and is used to make the antenna 290 available for both downlink and uplink. The duplex system used in the following example is time division duplex (TDD). However, the duplex system is not limited to TDD and may be frequency division duplex (FDD). The component circuits identical to those of the ground antenna device 200 described in the first embodiment will not be described below, and the differences will be mainly described.

Figure 19:
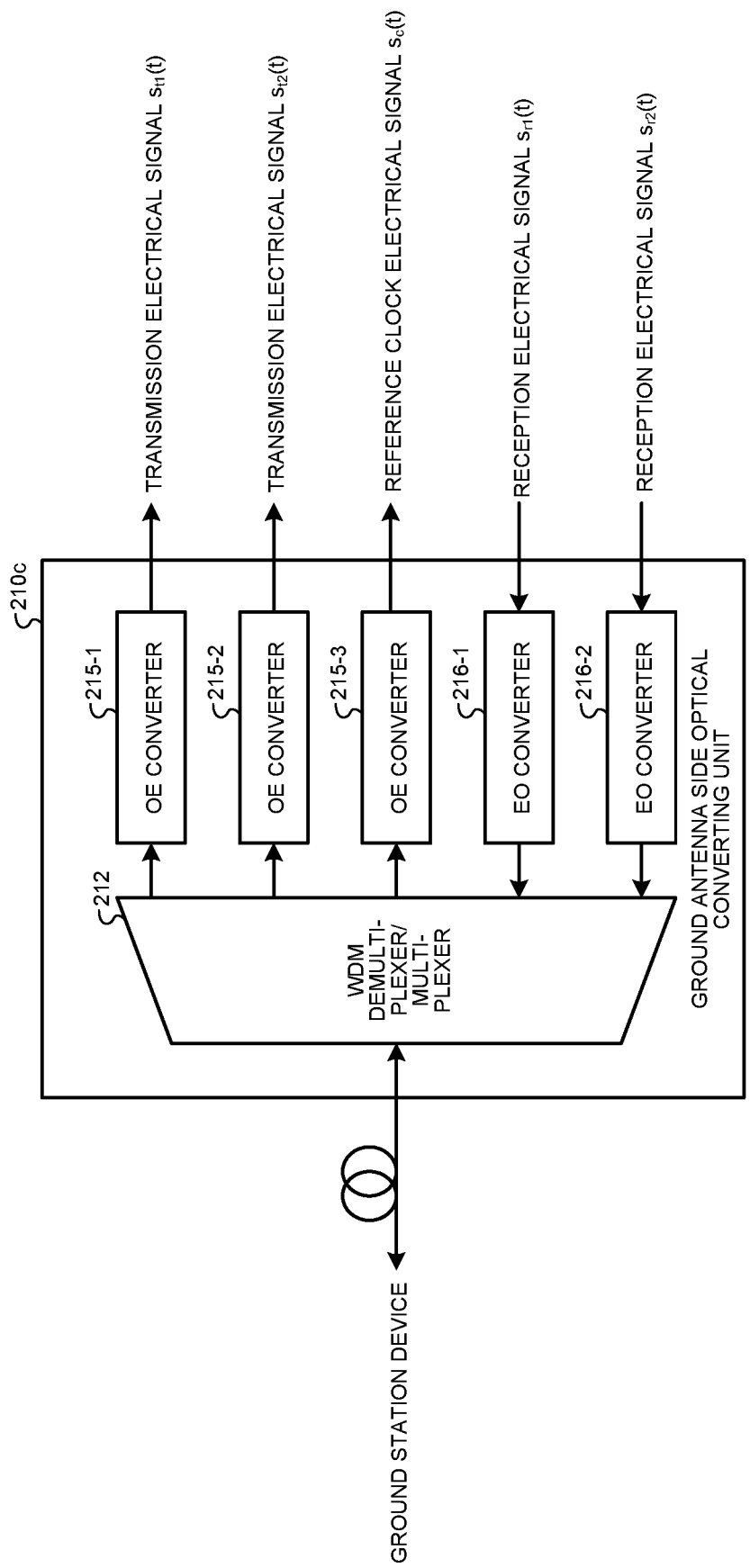
FIG. 19 is a diagram illustrating an exemplary configuration of a ground antenna side optical converting unit illustrated in FIG. 18.

FIG. 19 is a diagram illustrating an exemplary configuration of the ground antenna side optical converting unit 210c. The ground antenna side optical converting unit 210c includes a WDM demultiplexer/multiplexer 212, the OE converters 215-1 to 215-3, and EO converters 216-1 and 216-2.

As described above, an optical signal exchanged with the ground station device 100c is a WDM signal containing the five optical signals obtained through electrical-optical conversion of the original electrical signals $s_{t1}(t)$, $s_{t2}(t)$, $s_c(t)$, $s_{r1}(t)$, and $s_{r2}(t)$. The WDM demultiplexer/multiplexer 212 demultiplexes and multiplexes these five optical signals. Specifically, the WDM demultiplexer/multiplexer 212 demultiplexes the optical signal received from the ground station device 100c into the optical signal obtained through conversion of the transmission electrical signal $s_{t1}(t)$, the optical signal obtained through conversion of the transmission electrical signal $s_{t2}(t)$, and the optical signal obtained through conversion of the reference clock electrical signal $s_c(t)$, and outputs the demultiplexed optical signals to the corresponding OE converters 215-1, 215-2, and 215-3. The WDM demultiplexer/multiplexer 212 also multiplexes the optical signal obtained through conversion of the reception electrical signal $s_{r1}(t)$ at the EO converter 216-1 and the optical signal obtained through conversion of the reception electrical signal $s_{r2}(t)$ at the EO converter 216-2, and outputs the multiplexed signal to the ground station device 100c.

The OE converter 215-1 performs optical-electrical conversion on the optical signal input from the ground station device 100c through the WDM demultiplexer/multiplexer 212 to take the transmission electrical signal $s_{t1}(t)$. Similarly, the OE converter 215-2 performs optical-electrical conversion on the optical signal input from the ground station device 100c through the WDM demultiplexer/multiplexer 212 to take the transmission electrical signal $s_{t2}(t)$. The OE converter 215-3 performs optical-electrical conversion on the optical signal input from the ground station device 100c through the WDM demultiplexer/multiplexer 212 to take the reference clock electrical signal $s_c(t)$. The EO converter 216-1 performs electrical-optical conversion on the reception electrical signal $s_{r1}(t)$ obtained through frequency conversion of the uplink signal at the frequency converting section 260-1 illustrated in FIG. 18, and outputs the resultant signal to the WDM demultiplexer/multiplexer 212. The EO converter 216-2 performs electrical-optical conversion on the reception electrical signal $s_{r2}(t)$ obtained through frequency conversion of the uplink signal at the frequency converting section 260-2 illustrated in FIG. 18, and outputs the resultant signal to the WDM demultiplexer/multiplexer 212.

Figure 20:
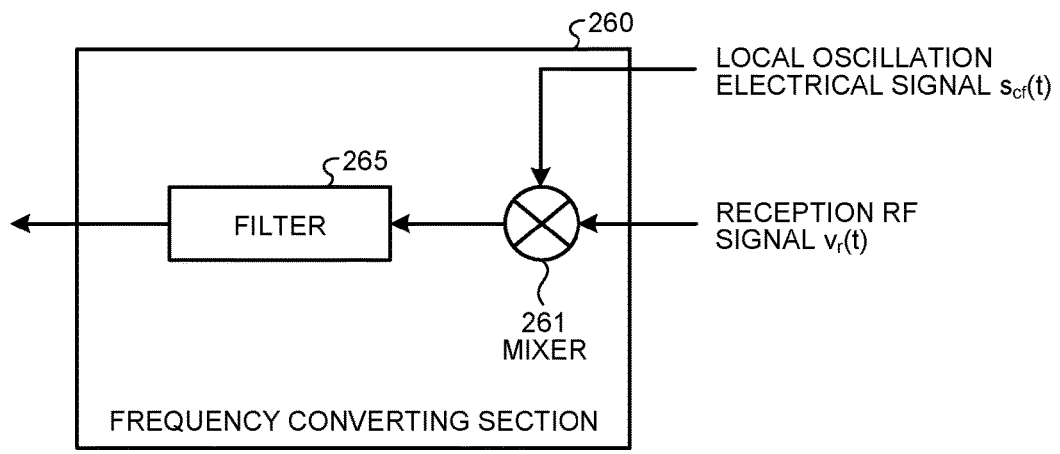
FIG. 20 is a diagram illustrating an exemplary configuration of a frequency converting section illustrated in FIG. 18.

FIG. 20 is a diagram illustrating an exemplary configuration of the frequency converting sections 260-1 and 260-2 illustrated in FIG. 18. Because the frequency converting sections 260-1 and 260-2 have the same configuration, one of them is depicted as the frequency converting section 260 in FIG. 20. The main function of the frequency converting section 260 is similar to that of the frequency converting section 250 described in the first embodiment, but the frequency converting section 260 down-converts the frequency of a reception RF signal received at the antenna 290 illustrated in FIG. 18. The frequency converting section 260 includes a mixer 261 and a filter 265. A reception RF signal $v_r(t)$ and the local oscillation electrical signal $s_{cf}(t)$ generated by the PLL section 230 illustrated in FIG. 18 are input to the mixer 261. The mixer 261 down-converts the frequency of the reception RF signal $v_r(t)$ by multiplying the reception RF signal $v_r(t)$ by the local oscillation electrical signal $s_{cf}(t)$, and outputs the down-converted signal to the filter 265. The filter 265 removes unnecessary frequency components from the input signal. Here, if baseband signals are input as frequency-converted signals, a low-pass filter is suitable for the filter 265. If IF band signals are input as frequency-converted signals, a band-pass filter that passes the corresponding IF band is suitable for the filter 265. However, another type of filter may be used as the filter 265.

Figure 21:
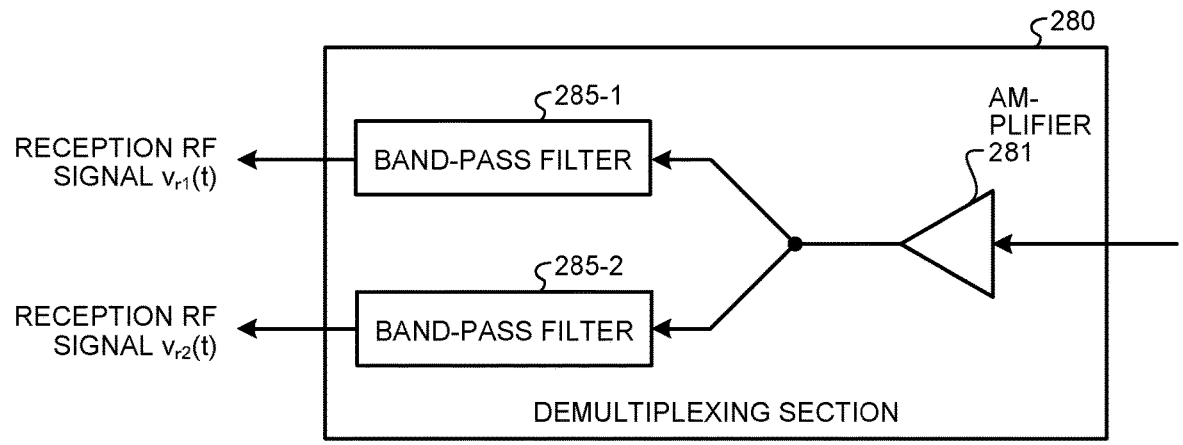
FIG. 21 is a diagram illustrating an exemplary configuration of a demultiplexing section illustrated in FIG. 18.

FIG. 21 is a diagram illustrating an exemplary configuration of the demultiplexing section 280 illustrated in FIG. 18. The demultiplexing section 280 includes an amplifier 281 and band-pass filters 285-1 and 285-2. A reception RF signal output from the duplexer 291 illustrated in FIG. 18 is input to the amplifier 281. The amplifier 281 amplifies the input reception RF signal. The amplified reception RF signal is distributed to the two band-pass filters 285-1 and 285-2. The band-pass filter 285-1 extracts a reception RF signal $V_{r1}(t)$ from the input signal and outputs the signal to the frequency converting section 260-1 illustrated in FIG. 18. The band-pass filter 285-2 extracts a reception RF signal $V_{r2}(t)$ from the input signal and outputs the signal to the frequency converting section 260-2 illustrated in FIG. 18.

As described above, according to the present embodiment, in the base station apparatus 1c based on the analog optical RoF technique, the ground station device 100c and the plurality of ground antenna devices 200c perform WDM on downlink signals to be transmitted to a mobile station, a reference clock signal, and uplink signals transmitted from the mobile station, thereby implementing an optical remote radio system. Consequently, the frequencies of the wireless signals that are transmitted and received by the plurality of ground antenna devices can be accurately synchronized.

Fourth Embodiment

FIG. 22 is a diagram illustrating an exemplary configuration of a ground station device 100d according to the fourth embodiment. Note that a base station apparatus including the ground station device 100d is referred to as the base station apparatus 1d.

The base station apparatus 1d according to the present embodiment is obtained by replacing the ground station device 100c of the base station apparatus 1c described in the third embodiment with the ground station device 100d. The ground station device 100d includes the wireless modulating section 110, a wireless demodulating section 120d, the reference clock signal generating section 130, and ground station side optical converting units 150c-1 to 150c-N.

In the same manner as the ground station device 100c according to the third embodiment, the ground station device 100d according to the present embodiment is configured to subject both downlink and uplink transmission signals to WDM transmission in the optical fiber section. The ground station device 100d is based on the configuration of the ground station device 100c but differs from the ground station device 100c in that the N ground station side optical converting units 150c-1 to 150c-N are provided and that N reception electrical signals $s_{r1}(t)$ and N reception electrical signals $s_{r2}(t)$ received at the N ground antenna devices 200c-1 to 200c-N are input to the wireless demodulating section 120d. The differences from the third embodiment, particularly from the ground station device 100c, will be mainly described below. Because the wireless modulating section 110 and the reference clock signal generating section 130 of the ground station device 100d are respectively the same as the wireless modulating section 110 and the reference clock signal generating section 130 of the ground station device 100c, the descriptions thereof are omitted.

Each of the transmission electrical signals $s_{t1}(t)$ and $s_{t2}(t)$ output from the wireless modulating section 110 is distributed to the N ground station side optical converting units 150c-1 to 150c-N. Here, the ground station side optical converting units 150c-1 to 150c-N are the same as the ground station side optical converting unit 150c described in the third embodiment. The reference clock electrical signal $s_c(t)$ output from the reference clock signal generating section 130 is also distributed to the N ground station side optical converting units 150c-1 to 150c-N.

N sets of reception electrical signals $s_{r1}(t)$ and $s_{r2}(t)$ output from the ground station side optical converting units 150c-1 to 150c-N are input to the wireless demodulating section 120d. The wireless demodulating section 120d selects one maximum power signal from among the N reception electrical signals $s_{r1}(t)$ input or combines the N reception electrical signals $s_{r1}(t)$ into one signal using in-phase combining or maximal-ratio combining, and then demodulates the signal. Similarly, the wireless demodulating section 120d selects one maximum power signal from among the N reception electrical signals $s_{r2}(t)$ or combines the N reception electrical signals $s_{r2}(t)$ into one signal, and then demodulates the signal. Consequently, the signals received at the N ground antenna devices 200c-1 to 200c-N can undergo diversity reception, which is effective in making the quality of demodulation performance higher than in the third embodiment.

FIG. 23 is a diagram illustrating an exemplary configuration of a base station apparatus 1e capable of achieving the same effect as the base station apparatus 1d configured as illustrated in FIG. 22. The base station apparatus 1e includes a ground station device 100e in place of the ground station device 100d of the base station apparatus 1d. The ground station device 100e includes the wireless modulating section 110, the wireless demodulating section 120, signal selecting sections 125-1 and 125-2, the reference clock signal generating section 130, and the ground station side optical converting units 150c-1 to 150c-N. As illustrated in FIG. 23, the base station apparatus 1e differs from the base station apparatus 1d in that the base station apparatus 1e includes the signal selecting sections 125-1 and 125-2 between the wireless demodulating section 120 and the ground station side optical converting units 150c-1 to 150c-N. The wireless demodulating section 120 of the ground station device 100e is the same as the wireless demodulating section 120 of the ground station device 100c described in the third embodiment.

The signal selecting section 125-1 selects one maximum power signal from among the N reception electrical signals $s_{r1}(t)$ output from the ground station side optical converting units 150c-1 to 150c-N or combines the N reception electrical signals $s_{r1}(t)$ into one signal using in-phase combining or maximal-ratio combining, and then outputs the signal to the wireless demodulating section 120. Similarly, the signal selecting section 125-2 selects one maximum power signal from among the N reception electrical signals $s_{r2}(t)$ output from the ground station side optical converting units 150c-1 to 150c-N or combines the N reception electrical signals $s_{r2}(t)$ into one signal using in-phase combining or maximal-ratio combining, and then outputs the signal to the wireless demodulating section 120.

As described above, according to the present embodiment, in the base station apparatuses 1d and 1e based on the analog optical RoF technique, the ground station devices 100d and 100e and the plurality of ground antenna devices 200c perform WDM on downlink signals to be transmitted to a mobile station, a reference clock signal, and uplink signals transmitted from the mobile station, thereby implementing an optical remote radio system. Consequently, the frequencies of the wireless signals that are transmitted and received by the plurality of different ground antenna devices can be accurately synchronized. Further, because the ground station devices 100d and 100e perform diversity reception on uplink signals, high-quality uplink transmission can be achieved.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST 1, 1a, 1b, 1c, 1d, 1e base station apparatus; 100, 100a, 100b, 100c, 100d, 100e ground station device; 110 wireless modulating section; 120, 120d wireless demodulating section; 125-1, 125-2 signal selecting section; 130 reference clock signal generating section; 140 reference clock signal optical converting unit; 150, 150-1 to 150-N, 150b, 150b-1 to 150b-N, 150c, 150c-1 to 150c-N ground station side optical converting unit; 141, 151-1, 151-2, 151-3, 216-1, 216-2 EO converter; 145 optical amplifier; 152-1, 152-2, 215-1, 215-2, 215-3 OE converter; 155 WDM multiplexer; 156 WDM demultiplexer/multiplexer; 200, 200-1 to 200-N, 200c, 200c-1 to 200c-N ground antenna device; 210, 210c ground antenna side optical converting unit; 230 PLL section; 250, 250-1, 250-2, 260, 260-1, 260-2 frequency converting section; 251, 261 mixer; 255, 285-1, 285-2 bandpass filter; 265 filter; 270 multiplexing section; 271 multiplexer; 275, 281 amplifier; 280 demultiplexing section; 290 antenna; 291 duplexer.

The invention claimed is:

1. A base station apparatus comprising:
ground station circuitry; and
a plurality of ground antennas coupled to the ground station circuitry via an optical transmission path and linearly distributed along a traveling direction of a mobile station, wherein
the ground station circuitry and the plurality of the ground antennas form a communication area that is a linear cell, and the plurality of the ground antennas synchronously transmit identical signals at the same frequency toward the mobile station,
the ground station circuitry being configured to perform electrical-optical conversion on an analog electrical signal to be transmitted to the mobile station and a reference clock signal to generate optical signals, perform wavelength division multiplexing on the obtained optical signals to generate a multiplexed optical signal, and output the multiplexed optical signal to the optical transmission path, and
each of the plurality of ground antennas being configured to demultiplex the multiplexed optical signal input from the optical transmission path into demultiplexed optical signals, perform optical-electrical conversion on the demultiplexed optical signals to generate electrical signals, up-convert a frequency of the analog electrical signal obtained through the optical-electrical conversion based on the reference clock signal obtained through the optical-electrical conversion to generate an up-converted signal, and transmit the up-converted signal to the mobile station, and wherein the ground station circuitry includes:
a transmission electrical signal generator to generate the analog electrical signal;
a reference clock signal generator to generate the reference clock signal;
an electrical-optical converter to perform the electrical-optical conversion on the analog electrical signal and the reference clock signal to generate the optical signals, perform the wavelength division multiplexing on the optical signals obtained through the electrical-optical conversion to generate the multiplexed optical signal, output the multiplexed optical signal to the optical transmission path, receive a multiplexed optical signal from each of the ground antennas, the multiplexed optical signal being obtained by each of the ground antennas through electrical-optical conversion of analog electrical signals received from the mobile station and through wavelength division multiplexing, and being output by each of the ground antennas to the optical transmission path, demultiplex the received multiplexed optical signal into demultiplexed optical signals, and perform optical-electrical conversion on the demultiplexed optical signals to generate electrical signals; and
a wireless demodulator to demodulate the electrical signals obtained through the optical-electrical conversion at the electrical-optical converter, and wherein each of the plurality of ground antennas includes:
an optical-electrical converter to demultiplex the multiplexed optical signal input from the optical transmission path into the demultiplexed optical signals, perform the optical-electrical conversion on the demultiplexed optical signals to generate the electrical signals, perform the electrical-optical conversion on the analog electrical signals received from the mobile station to generate optical signals, perform the wavelength division multiplexing on the optical signals to generate the multiplexed optical signal, and output the multiplexed optical signal to the optical transmission path;
first frequency conversion processing circuitry to up-convert the frequency of the analog electrical signal obtained through the optical-electrical conversion at the optical-electrical converter based on the reference clock signal obtained through the optical-electrical conversion at the optical-electrical converter; and
second frequency conversion processing circuitry to down-convert a frequency of the analog electrical signals received from the mobile station based on the reference clock signal obtained through the optical-electrical conversion at the optical-electrical converter to generate down-converted analog electrical signals, and output the down-converted analog electrical signals to the optical-electrical converter.

2. The base station apparatus according to claim 1, wherein
the wireless demodulator receives, from the electrical-optical converter, analog electrical signals received by the plurality of ground antennas from the mobile station, and performs diversity demodulation on the received analog electrical signals.

3. The base station apparatus according to claim 2, wherein
the wireless demodulator selects one maximum power analog electrical signal from among the analog electrical signals received from the electrical-optical converter, and demodulates the selected analog electrical signal.

4. The base station apparatus according to claim 2, wherein
the wireless demodulator combines the analog electrical signals received from the electrical-optical converter into one combined analog electrical signal using in-phase combining, and demodulates the combined analog electrical signal.

5. Ground station circuitry forming a base station apparatus of a wireless communication system together with a plurality of ground antennas, which are linearly distributed along a traveling direction of a mobile station, coupled via an optical transmission path, wherein
the ground station circuitry and the plurality of the ground antennas form a communication area that is a linear cell, and the plurality of the ground antennas synchronously transmit identical signals at the same frequency toward the mobile station,
the ground station circuitry is configured to perform electrical-optical conversion on an analog electrical signal to be transmitted to the mobile station and a reference clock signal to be used for up-converting the analog electrical signal to generate optical signals, perform wavelength division multiplexing on the obtained optical signals to generate a multiplexed optical signal, and transmit the multiplexed optical signal to the plurality of ground antenna via the optical transmission path, and wherein
the ground station circuitry comprises:
a transmission electrical signal generator to generate the analog electrical signal:
a reference clock signal generator to generate the reference clock signal; and
an electrical-optical converter to perform the electrical-optical conversion on the analog electrical signal and the reference clock signal to generate the optical signals, perform the wavelength division multiplexing on the optical signals obtained through the electrical-optical conversion to generate the multiplexed optical signal, output the multiplexed optical signal to the optical transmission path, receive a multiplexed optical signal from each of the ground antennas, the multiplexed optical signal being obtained by each of the ground antennas through electrical-optical conversion of analog electrical signals received from the mobile station and through wavelength division multiplexing, and being output by each of the ground antennas to the optical transmission path, demultiplex the received multiplexed optical signal into demultiplexed optical signals, and perform optical-electrical conversion on the demultiplexed optical signals to generate electrical signals; and
a wireless demodulator to demodulate the electrical signals obtained through the optical-electrical conversion at the electrical-optical converter.

6. The ground station circuitry according to claim 5, wherein
the wireless demodulator receives, from the electrical-optical converter, analog electrical signals received by the plurality of ground antennas from the mobile station, and performs diversity demodulation on the received analog electrical signals.

7. The ground station circuitry according to claim 6, wherein
the wireless demodulator selects one maximum power analog electrical signal from among the analog electrical signals received from the electrical-optical converter, and demodulates the selected analog electrical signal.

8. The ground station circuitry according to claim 6, wherein
the wireless demodulator combines the analog electrical signals received from the electrical-optical converter into one combined analog electrical signal using in-phase combining, and demodulates the combined analog electrical signal.

9. A ground antenna coupled to ground station circuitry via an optical transmission path and constituting a base station a wireless communication system together with other ground antennas, the ground station circuitry being configured to perform electrical-optical conversion on an analog electrical signal to be transmitted to a mobile station and a reference clock signal to be used for up-converting the analog electrical signal to generate optical signals, perform wavelength division multiplexing on the optical signals to generate a multiplexed optical signal, and output the multiplexed optical signal to the optical transmission path, wherein
the ground antenna being linearly distributed along with the other ground antenna devices along a traveling direction of the mobile station,
the ground station circuitry and the plurality of the ground antennas form a communication area that is a linear cell, and the plurality of the ground antenna device synchronously transmit identical signals at the same frequency toward the mobile station,
the ground antenna demultiplexes the multiplexed optical signal input from the optical transmission path into demultiplexed optical signals, performs optical-electrical conversion on the demultiplexed optical signals to generate electrical signals, up-converts a frequency of the analog electrical signal obtained through the optical-electrical conversion based on the reference clock signal obtained through the optical-electrical conversion to generate an up-converted signal, and transmits the up-converted signal to the mobile station, and wherein the ground antenna comprises:
an optical-electrical converter to demultiplex the multiplexed optical signal input from the optical transmission path into the demultiplexed optical signals, perform the optical-electrical conversion on the demultiplexed optical signals to generate the electrical signals, perform electrical-optical conversion on analog electrical signals received from the mobile station to generate optical signals, perform wavelength division multiplexing on the optical signals to generate a multiplexed optical signal, and output the multiplexed optical signal to the optical transmission path;
first frequency conversion processing circuitry to up-convert the frequency of the analog electrical signal obtained through the optical-electrical conversion at the optical-electrical converter based on the reference clock signal obtained through the optical-electrical conversion at the optical-electrical converter; and
second frequency conversion processing circuitry to down-convert a frequency of the analog electrical signals received from the mobile station based on the reference clock signal obtained through the optical-electrical conversion at the optical-electrical converter to generate down-converted analog electrical signals, and output the down-converted analog electrical signals to the optical-electrical converter.

* * * * *